United States Patent
Hase et al.

(10) Patent No.: US 7,510,769 B2
(45) Date of Patent: Mar. 31, 2009

(54) LAMINATE FILM

(75) Inventors: Takakazu Hase, Hirakata (JP); Yoshihiko Saito, Hirakata (JP); Koichi Takahashi, Hirakata (JP); Yasushi Kojima, Ibaraki (JP); Kenichi Shinya, Ibaraki (JP); Keishi Hamada, Ibaraki (JP)

(73) Assignees: Nippon Bee Chemical Co., Ltd., Osaka (JP); Nippon Paint Co., Ltd., Osaka (JP); Hitachi Chemical Co., Ltd., Tokyo (JP)

( * ) Notice: Subject to any disclaimer, the term of this patent is extended or adjusted under 35 U.S.C. 154(b) by 516 days.

(21) Appl. No.: 11/074,702

(22) Filed: Mar. 9, 2005

(65) Prior Publication Data

US 2005/0202266 A1 Sep. 15, 2005

(30) Foreign Application Priority Data

Mar. 10, 2004 (JP) ............................. 2004-067340

(51) Int. Cl.
*B32B 27/30* (2006.01)
*B32B 27/40* (2006.01)

(52) U.S. Cl. .............. 428/423.1; 428/423.3; 428/424.2; 428/500; 428/515

(58) Field of Classification Search .............. 428/423.1, 428/423.3, 424.2, 500, 515; 528/60, 75
See application file for complete search history.

(56) References Cited

U.S. PATENT DOCUMENTS

| 5,993,588 | A | 11/1999 | Nakamura et al. | |
| 6,329,060 | B1 * | 12/2001 | Barkac et al. | ............ 428/423.1 |
| 7,052,769 | B2 * | 5/2006 | Hase et al. | ............... 428/423.3 |

FOREIGN PATENT DOCUMENTS

| EP | 1 025 973 A1 | 8/2000 |
| JP | 2000044893 | * 2/2000 |

* cited by examiner

*Primary Examiner*—Thao T. Tran
(74) *Attorney, Agent, or Firm*—Harness, Dickey & Pierce, P.L.C.

(57) ABSTRACT

A laminate film has a clear layer (B) comprising an acrylic-based polymer (B1) having at least one longer unsaturated double bond group and at least one shorter unsaturated double bond group as side chains, and having a weight-average molecular weight not less than 50,000 but not more than 500,000, the longer unsaturated double bond group introduced in the acrylic-based polymer (B1) by a long-chain unsaturated carboxylic acid having a molecular weight of 150 or more, and the shorter unsaturated double bond group introduced in the acrylic-based polymer (B1) by a short-chain unsaturated carboxylic acid having a molecular weight of less than 150. Compared with laminate films prepared by spray coating, dip coating, or other coating methods, this laminate film is excellent in processability, coating film properties, and ornamental properties. Thus, an article can be excellently decorated with the laminate film provided by the present invention.

16 Claims, No Drawings

LAMINATE FILM

This Nonprovisional application claims priority under 35 U.S.C. § 119(a) on Patent Application No. 2004/67340 filed in Japan on Mar. 10, 2004, the entire contents of which are hereby incorporated by reference.

FIELD OF THE INVENTION

The present invention relates to a laminate film that is used for giving a decorative appearance to an article (a product, a molded product, a shaped product, a thing having a certain shape, a three dimensional things, a tangible article, etc.) by film decoration method.

BACKGROUND OF THE INVENTION

For articles (examples of the articles encompasses shaped products (i.e. products having been processed to have desired shapes) such as metal products, plastic products, inorganic products, wood products and the like), coating (painting) process to form a coating film on the articles (shaped products) is carried out in some cases, in order to give the article durability and/or aesthetic property including hues. The articles to be coated (hereinafter, referred to as coating-target articles) are various in terms of their materials, shapes and the like. In view of this, spray coating, dip coating and other coating method are widely used because it is relatively easy by using these methods to form the coating film in accordance with complicate shapes of the coating-target article, and to form the coating film in bag-shaped sections (cave-shaped sections) and/or gaps of the coating-target article.

In general, the coating film formed by coating (painting) the coating-target article is laminate film including a plurality of layers. For instance, the laminate film includes (a) a base film for giving the laminate film adhesiveness and anticorrosiveness so as to allow the laminate film to be adhered on a surface of the coating-target article and to protect the coating-target article from being corroded, (b) a finish-coat film for giving the coating-target article aesthetic appearance, (c) a protective film for protecting the finish-coat film, and/or (d) the like layer. Therefore, in case where the spray coating or the dip coating is applied, a step (coating step) of coating the coating-target article with paint by spraying the paint onto the coating-target article or dipping the coating-target article in the paint, and a step (fixing step) of fixing the paint on the coating-target article by drying or baking are repeated in turn in order to form the respective films of the laminate film.

The spray coating and the dip coating, which are multi-staged process in which the coating step and the fixing step are repeated in turn require a large coating site in which a long process line is constructed for the multi-staged process. Moreover, because the coating step and the fixing step are carried out in multi stages, the process management is complicate. Further, the multi-stage process causes a large consumption of a volatile material in the coating step and the fixing step, and requires a large amount of energy to repeat the coating step and the fixing step.

Therefore, it is difficult to solve or achieve the followings problems or required improvement in the coating process using the spray coating or the dip coating. The problems and improvements are: need of securing the coating site; need of improving cost performance by reducing maintenance cost for coating and drying, alleviating smell of the volatile material, and reducing a volatilized amount of the volatile material, and the like improvement; need of attaining easy management for the coating process; need of reducing the energy consumption; and the like needs.

As a coating method for realizing the improvement in cost performance, easy management of the coating process and the lower energy consumption, Publications of Japanese Patent Applications, publication Nos. 2000-79796 (Tokukai 2000-79796; published Mar. 21, 2000), and 10-58895 (Tokukaihei 10-58895; published on Mar. 3, 1998) and the like publication, for example, teach so-called film decoration method in which the coating-target article is coated with a laminate film which comprises a plurality of layers in lamination. In the film decoration method, the laminate film is placed on the surface of the coating-target article with no space therebetween so as to coat the coating-target article. Therefore, the film decoration method requires no multi staged coating process unlike the spray coating, dip coating and the like coating methods. Moreover, the process of the film decoration method is easy to manage and has lower energy consumption.

Meanwhile, it is required for the laminate film that it have properties (hardness, non-stickiness, solvent resistance, chemical resistance and other properties; hereinafter referred to as "coating film properties) realized in the spray coating, dip coating, and like, and that it have ornamental property (property to give the coating-target article a decorative appearance) and processability (property to enable appropriate decoration of the coating-target article). Here, the ornamental property includes: a shining appearance that indicates how shiny (twinkling) the laminate film is when the coating-target article is decorated with the laminate film; light scattering property of the laminate film when the coating-target article is decorated with the laminate film; flip-flop property that indicates a contrast between a highlighted look and a shaded look of the laminate film when the coating-target article is decorated with the laminate film; and other property. Moreover, the processability includes: traceability (shape-tracing ability) for a shape of the coating-target article; reproducibility for the 3-dimentional shape of the coating-target article; easy handling such as easiness in winding the laminate film; and other property.

However, the conventional laminate film has a difficulty to attain the processability and ornamental property as well as the coating film properties: the conventional film with high coating film properties is poor in the processability and ornamental property: likewise, the conventional film with high processability has a problem in the coating film properties and the ornamental property.

More specifically speaking, if the processability of the laminate film is to be improved, it is necessary to give the laminate film flexibility so that the laminate film can trace the shape of the shaped product (coating-target article). The flexibility can be attained by preparing the laminate film with a resin having a low glass transition temperature, by reducing the cross-linking density of the laminate film, or by the like.

However, if the laminate film is improved in flexibility, it becomes difficult to attain the coating film properties of the laminate film. Moreover, it becomes easy to disorder an array of a light scattering material or the like that gives the laminate film twinkling sensation and flip-flop property. Thus, it becomes difficult to attain the ornamental property.

As described above, there are such problems for the conventional film decoration method that when the processability necessary for decorating the coating-target article with the laminate film is attained, it is difficult to attain the coating film properties and the ornamental property equivalent to these attained in the spray coating, dip coating, and other coating methods.

SUMMARY OF THE INVENTION

The present invention is to solve the aforementioned problem. An object to the present invention is to provide a laminate film having excellent processability (e.g., the laminate film is evenly extendable following a shape of a coating target article so that the laminate film has an even film thickness after decoration process) while still having coating film properties required for coating process, and further having ornamental properties and coating film properties as good as or better than these attained in conventional spray coating, dip coating, and other coating methods.

As a result of diligent studies on the aforementioned object, the inventors of the present invention found out that, in order to attain the processability as well as the coating film properties and ornamental properties, it is important for the laminate film that it has a clear layer that does not give adverse effect (e.g. disordering orientation of color pigment and/or the other component in a color layer) as a result of deformation of the clear layer due to e.g. (a) heat applied, e.g., in forming the color layer during production process of the laminate film or in decorating the coating target article with the laminate film, or (b) extension of the laminate film during decoration.

The inventors found that, by having, as its side chain, at least one reactive double bond group that allows cross linkage by curing caused by electromagnetic radiation or the other method, and controlling length of the reactive double bond group, the clear layer can attain excellent processability and the laminate film has satisfactory coating film properties and ornamental properties, which have been regarded as being incompatible with respect to the processability. Based on this finding, the inventors accomplished the present invention.

A laminate film according to the present invention has a guard film layer (A); and a clear layer (B) formed on the guard film layer (A). The clear layer (B) is made of a clear coating material having, at least, an acrylic-based polymer (B1), an urethane-based oligomer (B2), and a polymerization initiator (B3). The acrylic-based polymer (B1) has at least one longer unsaturated double bond group and at least one shorter unsaturated double bond group as side chains, and having a weight-average molecular weight not less than 50,000 but not more than 500,000, the longer unsaturated double bond group introduced in the acrylic-based polymer (B1) by a long-chain unsaturated carboxylic acid having a molecular weight of 150 or more, and the shorter unsaturated double bond group introduced in the acrylic-based polymer (B1) by a short-chain unsaturated carboxylic acid having a molecular weight of less than 150. Acrylic-based polymer (B1) content is not less than 30 parts by mass but not more than 70 parts by mass, based on 100 parts by mass of a total (B1+B2) of solid contents by weight of the acrylic-based polymer (B1) and the urethane-based oligomer (B2). Urethane-based oligomer (B2) content is not less than 30 parts by mass but not more than 70 parts by mass, based on 100 parts by mass of the total (B1+B2).

For a fuller understanding of the nature and advantages of the invention, reference should be made to the ensuing detailed description taken in conjunction with the accompanying drawings.

DESCRIPTION OF THE EMBODIMENTS

An embodiment according to the present invention is described below.

A laminate film according to the present invention includes a plurality of layers in lamination. The respective layers contain different coating materials from each other. The laminate film can be used for decorating a surface of article (base article; shaped product; molded product or the like) such as parts for automobiles, parts for electronic devices, and the like. The decoration is carried out by placing the laminate film on a surface of the article by using an adhesive agent or the like without a gap therebetween.

Moreover, the laminate film of the present invention is excellent in processability, coating film properties, ornamental property, and the other properties. The processability includes, for example, smoothness of the laminate film adhered on the surface of the article, reproducibility of a 3-dimentional shape of the article, traceability (shape-tracing ability) of the shape of the article, and the like property. The coating film properties includes, for example, hardness, non-stickiness, solvent resistance, chemical resistance, and the like property. The ornamental property includes, for example, shininess, light scattering property, flip-flop property, and the like. The other property includes, for example, firm adhesion property, weatherability, mar resistance, impact resistance.

Therefore, the use of the laminate film of the present invention makes it possible to appropriately decorate (adhere the laminate film on) the article and give the decorated article (decorated article) excellent coating film properties and the ornament property. That is, the laminate film of the present invention has all of the processability required in adhering the article with the film, the ornamental property that is to be given to the decorated article), and the coating property required in coating the article.

The laminate film of the present invention includes a guard film layer (A) and a clear layer (B) formed on the guard film layer (A). The clear layer (B) contains a clear paint as a painting material. The laminate film may include a color layer (C) on the clear layer (B). The color layer contains a color paint as a painting material. Moreover, as later described in detail, the laminate film may include, on the color layer (C), an adhesive agent layer and an inner film layer in this order if necessary. These layers are explained in order below.

In the following, the clear layer (B) and the color layer (C) are respectively films constituting the laminate film but having not been cured yet. Clear coating film and color coating film are respectively films decorated on the article, that is, films of the laminate film that has been adhered on the article and cured by electromagnetic ray application or heating (that is, the laminate film decorated on the surface of the decorate product).

[1] Guard Film Layer (A)

The guard film layer (A) is a supporting body for supporting the coating materials that are respectively contained in the clear layer (B) and the color layer (C) described later. The guard film layer (A) is used in order to maintain a good processing property in performing the decorative-appearance-making process of the article. Moreover, after the decorated article (article having decorative appearance) is formed by placing the laminate film on the article, the guard film layer (A) protects the clear layer (B), the color layer (C), and the like, thereby attaining better damage resistance property of the surface of the article and surface smoothness of the surface of the decorated article.

The guard film layer (A) has a tensile strength whose lower limit at 20° C. is 10 kg/cm$^2$ or higher and preferably 50 kg/cm$^2$ or higher, and whose upper limit at 20° C. is 200 kg/cm$^2$ or lower, and preferably 100 kg/cm$^2$ or lower. If the tensile strength is lower than 10 kg/cm$^2$, the laminate film will have an uneven film thickness after the decorative-appearance-making process of the article. If the tensile strength is higher than 200 kg/cm$^2$, the decorative-appearance-making process of the article cannot be carried out with a high shape-suiting property with respect to a three-dimensional shape of the article. Thus, it becomes difficult to perform a good decorative-appearance-making process.

Note that the tensile strength (kg/cm$^2$) refers to a force that is applied per unit area at the time when the guard film layer (A) is torn off by being pulled at a pulling rate of 50 mm/min under a temperature condition of 20° C. by using a Tensilon HTM-500 (Product Name: made by Toyo Baldwin Co., Ltd.).

Moreover, elongation after tearing (after-tearing elongation) (at 20° C.) of the guard film layer (A) is preferably 50% or more, and more preferably 100% or more. If the after-tearing elongation is 50% or more, it will be possible to attain an excellent shape-tracing property with respect to the three-dimensional shape of the article, thereby attaining a high-quality decorative-appearance-making process.

The after-tearing elongation (%) is determined by using the Tensilon HTM-500 used in measuring the tensile strength. That is, the guard film layer (A) is pulled at a pulling rate of 50 mm/min under a temperature condition of 20° C. by using a Tensilon HTM-500 until the guard film layer (A) is torn off. The after-tearing elongation is determined by comparing a length of the guard film layer (A) at the time of the tear and a length thereof before being pulled.

Furthermore, in order to attain a good light transparence after the decorative-appearance-making process, light transparence (at wavelength of 365 nm) of the guard film layer (A) is preferably 50% or more, and more preferably 70% or more. If the light transparence is less than 50%, the photo-curing of the clear layer (B) becomes difficult after the decorative-appearance-making process because the low transparence reduces an amount of a light beam to pass through the guard film layer (A) to reach the clear layer (B).

Moreover, the guard film layer (A) functions as the surface of the article on which the laminate film is adhered. Thus, it is preferable that the guard film layer (A) have a water contact angle in a range of 60° or more and 120° or less. It is more preferable that the guard film layer (A) have a water contact angle in a range of 70° or more and 110° or less. If the water contact angle is less than 60°, it becomes difficult to peel off the guard film layer (A) after the decorative-appearance-making process of the article. On the other hand, if the water contact angle is more than 120°, the guard film layer (A) will repel the clear coating material when applying the clear coating material thereon, the clear coating material being the coating material from which the clear layer (B) is made. Thus, it will become difficult to form the clear layer (B) on the guard film layer (A).

The guard film layer (A) is not particularly limited in terms of its material, configuration, and the like, provided that the guard film layer (A) has the aforementioned tensile strength, elongation after-tearing, light transmittance, and water contact angle. Specifically, the guard film layer (A) may be: polyethylene terephthalate (PET)-based films such as Nova Clear SG007 (Product Name: made by Mitsubishi Chemical Corp.), Dia cral series (made by Mitsubishi Plastics Inc.) and the like; polyolefine-based films such as opulent TPX series (made by Mitsui Chemicals Inc.), tolefan series (made by Toray Plastic Films Co., Ltd.), and the like; acrylic-based film such as acrylplene series (made by Mitsubishi Rayon Co., Ltd.).

Moreover, the guard film layer (A) may be arranged as, for example, a single layered film, a co-extrusion film, a laminate film, a peel-off film that has been subjected to peel-off treatment, and the like film. The peel-off treatment for the peel-off film is not particularly limited, but may be silicone-type treatment, non-silicone-type treatment, urethane resin coating treatment, and the like treatment.

[2] Clear layer (B)

The clear layer (B) gives, to the laminate film, not only (i) physical/chemical properties such as coating film properties (hardness, non-stickiness, solvent resistance, chemical resistance, and the like), weatherability, scratch resistance, impact resistance, water resistance, gasohol resistance (gasoline immersing test evaluation) but also (ii) transparency, glazing property, surface-smoothness. After the laminate film is placed on the article, the clear layer (B) in the laminate film is cured to be the clear coating film by radiating the electromagnetic rays or heating. Because different types of articles have different heat resistance, it is preferable that the clear layer (B) be made of a clear coating material that can be cured by radiating the electromagnetic rays thereon.

The clear layer (B) preferably has an after-tearing elongation of 400% or more under a temperature condition of 80° C. If the after-tearing elongation is less than 400%, flowability of the clear layer (B) becomes uneven in making the decorative appearance of the article by using the laminate film, thereby making it difficult to attain an even film thickness.

Note that the after-tearing elongation of the clear layer (B) is determined by using a pre-curing sample prepared as follows: (1) the clear coating material applied with a thickness of 40 μm on a PET (Polyethylene Terephthalate)-based film; (2) the clear coating material is dried at a temperature of 80° C. for 15 minutes; and (3) the PET (Polyethylene Terephthalate)-based film is peeled off from the dried clear coating material, thereby forming the pre-cured sample. At the temperature condition of 80° C., the pre-cured sample is pulled until tear at a pulling rate of 50 mm/min by using the Tensilon HTM-500. The after-tearing elongation of the clear layer (B) is determined by comparing a length of the pre-cured sample at the time of the tear and a length thereof before being pulled.

Moreover, as to a universal hardness (N/mm$^2$) of the clear coating film after the clear layer (B) is cured, it is preferable that the universal hardness be 40N/mm$^2$ or more, and more preferably 120N/mm$^2$ or more, under a temperature condition of 25° C. If the universal hardness is less than 40N/mm$^2$, the clear coating film has a low mar resistance.

Evaluation of the universal hardness is carried out by application of load onto the clear coating film obtained by curing the clear layer (B) formed on a guard film layer (A). Specifically, a load of 5 mN is applied for 30 seconds onto the clear coating film provided on the guard film layer (A) by using a fisher-scope (Registered Trademark) H-100 (Fisher Instruments K.K.), and a maximum depth of push-down concave shape of the clear coating film is measured. The universal hardness is evaluated based on the maximum depth.

Further, the tensile strength of the clear coating film after the clear layer (B) is cured is preferably 400 kg/cm$^2$ or more, and more preferably 450 kg/cm$^2$ or more, under a temperature condition of 20° C. If the tensile strength is less than 400 kg/cm$^2$, the laminate film has low mar resistance and low impact resistance. Moreover, the after-tearing elongation of the clear coating film obtained by curing the clear layer (B) is preferable 5% or more, and more preferably 7% or more. If the after-tearing elongation is less than 5%, the laminate film will have low mar resistance and poor flexibility.

Evaluation of the tensile strength and the after-tearing elongation of the clear coating film is carried out with a cured sample prepared as follows: (1) the clear coating material is applied on a PET-based film so as to be 40 μm in thickness when dried; (2) the clear coating material on the PET-based film is dried at 80° C. for 15 minutes, thereby forming a clear layer (B); (3) a PET-based film is further placed on the clear layer (B); (4) The clear layer (B) is cured by light radiation, thereby forming the clear coating film; and (5) both the PET-based films are peeled off from the clear coating film.

The tensile strength and the after-tearing elongation are determined by pulling the cured sample until tear at a pulling rate of 50 mm/min by using the Tensilon HTM-500 under a temperature condition of 20° C.

The clear layer (B) contains a clear coating material so that it satisfies each of the above conditions. It is more preferable that the clear coating material contain acrylic-based polymer (B1), urethane-based oligomer (B2), and a polymerization initiator (B3). Further, the clear coating material may be so arranged as to contain, in addition to those components, another component such as binder resin, a cross-linking agent, an ultraviolet ray absorbing agent (UVA), a light stabilizer (HALS), a leveling agent, a defoaming agent, a polymerization inhibitor, a solvent, and the like. The following explains those.

[2-1] Acrylic-Based Polymer (B1)

The acrylic-based polymer (B1) is a resin that has an acrylic resin structure whose main chain structure is formed by polymerization of an acrylic acid, a methacrylic acid, a derivative of an acrylic acid, and/or a derivative of a methacrylic acid (hereinafter, acrylic acids and/or methacrylic acids are referred to as (meth)acrylic acids, and their salts are referred to as (meth)acrylates). Moreover, the acrylic-based polymer (B1) has at least one reactive unsaturated double bond group as a side chain bonded to the main chain structure. Here, the reactive unsaturated double bond group is a substituent that can intermolecularly cross-link molecules, or intramolecularly cross-link part of a molecule with the other part of the molecule. The reactive unsaturated double bond group is introduced into a later-described precursor (acrylic-based polymer precursor) of the acrylic-based polymer by addition reaction of the acrylic-based polymer precursor with an unsaturated carboxylic acid or an isocyanato-group-containing (meth)acrylic compound.

A lower limit of the reactive unsaturated double bond group contained in the acrylic-based polymer (B1) is preferably 300 equivalent or more and more preferably 450 equivalent or more. An upper limit of the reactive unsaturated double bond group contained in the acrylic-based polymer (B1) is preferably 1500 equivalent or less and more preferably 900 equivalent or less.

If the lower limit of the reactive unsaturated double bond group contained in the acrylic-based polymer (B1) is less than 300 equivalent, this will result in low compatibility between the acrylic-based polymer (B1) and other components (such as the urethane-based oligomer and the other components) in the clear coating material. The low compatibility will lead to gelation, thereby making it difficult to form the clear layer (B). Moreover, this will cause the clear layer (B) to be less non-sticky and poor in flexibility. On the other hand, if the upper limit of the reactive unsaturated double bond group contained in the acrylic-based polymer (B1) is more than 1500 equivalent, the clear coating film obtained by curing the clear layer (B) will have a low degree of cross linking. This prevents the clear coating film from being hard enough (that is, having sufficient hardness) and causes the clear coating film to be sticky (tacky) and low in the gasohol resistance.

Moreover, as to weight-average molecular weight $M_w$ evaluated by gel permeation chromatography (standard polystyrene equivalent), a lower limit of the weight-average molecular weight $M_w$ of the acrylic-based polymer (B1) is 50,000 or more and preferably 80,000 or more, whereas an upper limit of the weight-average molecular weight $M_w$ of the acrylic-based polymer (B1) is 500,000 or less and preferably 400,000 or less.

If the weight-average molecular weight $M_w$ of the acrylic-based polymer (B1) is less than 50,000, the clear layer (B) tends to have tackiness. Further, it would leads to low after-tearing elongation that would possibly cause tearing of the lamination film in forming the lamination film. Moreover, if the weight-average molecular weight $M_w$ of the acrylic-based polymer (B1) is less than 50,000, the clear coating film obtained by curing the clear layer (B) tends to have low mar resistance.

On the other hand, if the weight-average molecular weight $M_w$ of the acrylic-based polymer (B1) is more than 500,000, this will result in low compatibility between the acrylic-based polymer (B1) and other components (such as the urethane-based oligomer and the other components) in the clear coating material. The low compatibility will lead to high viscosity of the clear coating material, thereby making it easy to cause the gelation. Moreover, if the increase in the viscosity is solved by diluting the clear coating material with an organic solvent, the clear coating material would have a significantly low solid content, thereby having a poor processability. Therefore, if the weight-average molecular weight $M_w$ of the acrylic-based polymer (B1) is more than 500,000, it becomes difficult to form the clear layer (B).

Further, the acrylic-based polymer (B1) contains a hydroxyl group. The presence of the hydroxyl group gives the acrylic-based polymer (B1) a better compatibility between the acrylic-based polymer (B1) and other components (such as the urethane-based oligomer and the other components) in the clear coating material. The better compatibility prevents turbidness (that is, prevents the clear coating film from being turbid in white. A lower limit of hydroxyl group value (OHV) in the acrylic-based polymer (B1) is preferably 30 mg KOH/g or more, and more preferably 50 mg KOH/g or more. An upper limit of hydroxyl group value (OHV) in the acrylic-based polymer (B1) is preferably 125 mg KOH/g and less, and more preferably 100 mg KOH/g or less. The OHV less than 30 is not preferably because, if so, the compatibility between the acrylic-based polymer (B1) and the urethane-based oligomer will be low so that the resultant coating film will be turbid. On the other hand, the OHV more than 125 is not preferable because, if so, the clear coating film will have low water resistance.

The acrylic-based polymer (B1) is prepared in the following manner: Addition reaction of an epoxy-group-containing copolymer (B1c) (which is a precursor of the acrylic-based polymer (B1)) is performed with a long-chain unsaturated carboxylic acid (B1d1) and a short-chain unsaturated carboxylic acid (B1d2), thereby obtaining an adduct. Then, isocyanato(-NCO)-group-containing (meth)acrylic compound (B1e) is added to an hydroxyl group of the adduct or an hydroxyl group of the epoxy-group-containing copolymer (B1c). In this way, the acrylic-based polymer (B1) is formed.

The epoxy-group-containing copolymer (B1c) can be obtained by copolymerization of (a) an epoxy-group-containing unsaturated compound (B1a) having both one epoxy group and a polymerizable unsaturated bond, and (b) an unsaturated compound (B1b) having a polymerizable unsaturated bond, under the presence of a radical polymerization initiator. The copolymerization can be carried out by well-known methods such as a solution polymerization method, and the like. The unsaturated compound (B1b) may be any compound having a polymerizable unsaturated bond. (Meth) acrylic acids and (meth)acrylates are preferable as the unsaturated compound (B1b).

The epoxy-group-containing unsaturated compound (B1a) may be any compound having at least one epoxy group and at least one polymerizable unsaturated bond in its molecule.

More specifically, examples of the epoxy-group-containing unsaturated compound (B1a) include epoxy-group-containing (meth)acrylates such as Glycidyl(meth)acrylate(2,3-epoxypropyl(meth)acrylate), 3,4-epoxycyclohexyl(meth)acrylate, and similar compounds.

Specific examples of the unsaturated compound (B1b) include: alkyl(meth)acrylates such as methyl(meth)acrylate, ethyl(meth)acrylate, n-propyl(meth)acrylate, n-butyl(meth)acrylate, isobutyl(meth)acrylate, t-butyl(meth)acrylate, ethylhexyl(meth)acrylate, stearyl(meth)acrylate, lauryl(meth)acrylate, tridecyl(meth)acrylate, and similar compounds; alicyclic(meth)acrylates such as cyclohexyl(meth)acrylate, isobornyl(meth)acrylate, dicyclopentanyl(meth)acrylate and similar compounds; aromatic (meth)acrylates such as styrene, phenoxyethyl(meth)acrylate and similar compounds; alkoxyalkyl(meth)acrylates such as ethoxyethyl(meth)acrylate, butoxyethyl(meth)acrylate, and similar compounds; hydroxyalkyl(meth)acrylates such as 2-hydroxyethyl(meth)acrylate, 2-hydroxybutyl(meth)acrylate, 2-hydroxypropyl (meth)acrylate, and similar compounds; alkoxyalkoxyalkyl (meth)acrylates such as 2-methoxyethoxyethyl(meth) acrylate 2-ethoxyethoxyethyl(meth)acrylate, and similar compounds; alkoxy(poly)alkyleneglycol(meth)acrylates such as methoxydiethyleneglycol(meth)acrylate, ethoxydiethyleneglycol(meth)acrylate, methoxytriethyleneglycol (meth)acrylate butoxytriethyleneglycol(meth)acrylate, methoxydipropyleneglycol(meth)acrylate, and similar compounds; dialkylaminoalkyl(meth)acrylates such as octafluoropentyl(meth)acrylate N,N-dimethylaminoethyl(meth) acrylate, and similar compounds; and other like compounds.

The unsaturated compound (B1b) may be one of the (meth) acrylic acids mentioned above, or a combination of two or more of the (meth)acrylic acids.

As to a mixing ratio between the epoxy-group-containing unsaturated compound (B1a) and the unsaturated compound (B1b), by solid content by weight, a lower limit of the epoxy-group-containing unsaturated compound (B1a) content (solid content by weight thereof, solid content by mass thereof) is preferably 10 parts by mass or more, more preferably 20 parts by mass or more, and an upper limit thereof is preferably 60 parts by mass or less, and more preferably 45 parts by mass or less, based on 100 parts by mass of sum of solid contents by weight (solid contents by mass) of the epoxy-group-containing unsaturated compound (B1a) and the unsaturated compound (B1b).

It is not preferable that epoxy-group-containing unsaturated compound (B1a) content be less than 10 parts by mass with respect to 100 parts by mass of the sum (B1a and B1b), because, if so, the hardenability of the clear layer (B) and performance of the clear coating film tend to be low. On the other hand, it is not preferable that the epoxy-group-containing unsaturated compound (B1a) content be more than 60 parts by mass with respect to 100 parts by mass of the sum (B1a and B1b), because, if so, the clear layer (B) tends to worsen Block-resistance at 80° C.

As for the epoxy-group-containing copolymer (B1c) obtained by copolymerization of the epoxy-group-containing unsaturated compound (B1a) and the unsaturated compound (B1b) in the above ratio, a lower limit of a weight average molecular weight $M_w$ of the epoxy-group-containing copolymer (B1c) is preferably 30,000 or more, and more preferably 50,000 or more, and an upper limit thereof is preferably 200,000 or less, and 150,000 or less, where the weight average molecular weight $M_w$ is measured by the gel permeation chromatography (standard polystyrene equivalent).

If the weight average molecular weight of the epoxy-group-containing copolymer (B1c) is less than 30,000, the clear layer (B) tends to have low tack free property. Moreover, if the weight average molecular weight of the epoxy-group-containing copolymer (B1c) is more than 200,000, the clear coating material tends to have low compatibility between the acrylic-based polymer (B1) and other components (such as the urethane-based oligomer and the other components) therein and high viscosity. Furthermore, if the clear coating material is diluted with an organic solvent in order to solve the increase of the viscosity, the solid content of the clear coating material is significantly lowered, thereby resulting in poor processability.

A lower limit of glass transition temperature of the epoxy-group-containing copolymer (B1c) is preferably 50° C. or more and more preferably 60° C. or more. An upper limit of the glass transition temperature of the epoxy-group-containing copolymer (B1c) is preferably 130° C. or less and more preferably 110° C. or less. If the glass transition temperature of the epoxy-group-containing copolymer (B1c) is less than 50° C., the clear layer (B) tends to have a low tack free property, and handling property tends to be low (for example, it becomes difficult to wind up the laminate film). On the other hand, if the glass transition temperature is more than 130° C., the clear layer (B) tends to be so hard that it loses flexibility, whereby the clear layer (B) is cracked in forming the laminate film or in decorating the article with the laminate film. Further, if the glass transition temperature is more than 130° C., the clear layer (B) tends to be poor in the hardenability and the clear coating film formed by curing the clear layer (B) tends to be poor in the appearance, coating film properties and the processability.

The epoxy-group-containing copolymer (B1c) having the above properties is reacted with an unsaturated carboxylic acid compound. Specifically, the epoxy-group-containing copolymer (B1c) having the above properties is reacted with an unsaturated carboxylic acid compound in the presence of a basic catalyst or phosphorus-based catalyst so that the carboxyl group of the unsaturated carboxylic acid compound is combined with epoxy group contained in the epoxy-group-containing copolymer (B1c). As a result of this reaction, the unsaturated carboxylic acid compound is added to the epoxy-group-containing copolymer, and becomes a side chain thereof. Thereby, an epoxy-group-containing copolymer having at least one reactive unsaturated double bond group as a side chain is obtained. This reactive unsaturated double bond group is introduced by the unsaturated carboxylic acid compound added to the epoxy-group-containing copolymer. Here, two types of unsaturated carboxylic acid compounds are used: the long-chain unsaturated carboxylic acid (B1d1), which is an unsaturated carboxylic compound of molecular weight of 150 or more, and the short-chain unsaturated carboxylic acid (B1d2), which is an unsaturated carboxylic compound of molecular weight of less than 150.

The long-chain unsaturated carboxylic acid (B1d1) may be: caprolactone modified (meth)acrylic acids such as ω-carboxy-polycaprolactonemonoacrylate, Aronix (Registered Trademark) M5300 (made by Toagosei Co., Ltd.), Aronix M5600 (made by Toagosei Co., Ltd.), and similar compounds; a compound obtained by ring-opening reaction between hydroxyl-group-containing (meth)acrylate and carboxylic anhydride (examples of this compound include: futaric monohydroxyethylacrylate, Aronix M5400 (made by Toagosei Co., Ltd.), β-acryloyloxyethylhydrogensuccinate, NK ester A-SA (made by Shin-Nakamura Chemical co. LTD, and similar compounds); and the like compounds.

Moreover, the short-chain unsaturated carboxylic acid (B1d2) may be (meth)acrylic acid, or a like compound.

As for the mixing ratio between the epoxy-group-containing copolymer (B1c) and the unsaturated carboxylic acid compounds, the carboxyl group of the unsaturated carboxylic acid compounds (a sum of the carboxyl groups of the long-chain unsaturated carboxylic acid (B1d1) and the short-chain unsaturated carboxylic acid (B1d2)) is not less than 0.8 equivalent but not more than 1.1 equivalent with respect to the epoxy group in the epoxy-group-containing copolymer (B1c). If the carboxyl group is less than 0.8 equivalent with respect to the epoxy group, the clear layer (B) tends to be low in the hardenability and have poor coating film properties as a whole. If the carboxyl group is more than 1.1 equivalent with respect to the epoxy group, the clear layer (B) tends to be low in the tack free property.

Moreover, as for the long-chain unsaturated carboxylic acid (B1d1) content in the unsaturated carboxylic acid compounds that is to be reacted with the epoxy-group-containing copolymer (B1c), a lower limit of the long-chain unsaturated carboxylic acid (B1d1) content is preferably 20 mol % or more, and more preferably 33 mol % or more with respect to a sum mol (B1d1+B1d2) of the long-chain unsaturated carboxylic acid (B1d1) and the short-chain unsaturated carboxylic acid (B1d2), whereas an upper limit thereof is preferably 80 mol % or less, and more preferably 67% or less. On the other hand, as for the short-chain unsaturated carboxylic acid (B1d2) content in the unsaturated carboxylic acid compounds that is to be reacted with the epoxy-group-containing copolymer (B1c), a lower limit of the short-chain unsaturated carboxylic acid (B1d2) content is preferably 20 mol % or more, and more preferably 33 mol % or more with respect to a sum mol (B1d1+B1d2) of the long-chain unsaturated carboxylic acid (B1d1) and the short-chain unsaturated carboxylic acid (B1d2), whereas an upper limit thereof is preferably 80 mol % or less, and more preferably 67% or less.

If the long-chain unsaturated carboxylic acid (B1d1) content is less than 20 mol % or the short-chain unsaturated carboxylic acid (B1d2) content is more than 80 mol %, cross-linkage structures will be formed closely between the reactive unsaturated double bond groups in curing the clear layer (B), the reactive unsaturated double bond groups introduced by the unsaturated carboxylic acids (B1da, B1d2). As a result the clear coating film obtained by the curing of the clear layer (B) lacks the flexibility. This would lead to cracking in the laminate film, when the laminate film laminated on the article does not be deformed in accordance with deformation of the article due to temperature change or the like.

Meanwhile, if the long-chain unsaturated carboxylic acid (B1d1) content is more than 80 mol % or the short-chain unsaturated carboxylic acid (B1d2) content is less than 20 mol %, the clear coating film tends to be poor in the chemical resistance, hardness, and gasohol resistance. Further, if the contents are as such, the clear layer (B) will be sticky undesirably.

After an adduct is obtained by adding the unsaturated carboxylic acid compound to the epoxy-group-containing copolymer (B1c), the adduct is reacted with an isocyanato-group-containing (meth)acrylic compound (B1e) so that the isocyanato-group-containing (meth)acrylic compound (B1e) is added to the hydroxyl group of the adduct. Thereby, the acrylic based polymer (B1) is obtained.

The isocyanato-group-containing (meth)acrylic compound (B1e) may be (a) methacryloiloxyethylisocyanate, (b) Karenz MOI (Registered Trademark; made by Showa Denko K.K.), (c) an adduct obtained by reacting one mol of a (meth)acrylate compound having one hydroxyl group (e.g. 2-hydroxyethylacrylate or a similar compound) with one mol of diisocyanate compound (e.g. hexamethylenediisocyanate or a similar compound), or (d) an other similar compound.

As to a mixing ratio between the adduct and the isocyanato-group-containing (meth)acrylic compound (B1e), it is preferable that the isocyanato-group-containing (meth)acrylic compound (B1e) be not less than 0.1 equivalent but not more than 0.8 equivalent with respect to the hydroxyl group contained in the adduct. If the isocyanato-group-containing (meth)acrylic compound (B1e) is less than 0.1 equivalent with respect to the hydroxyl group, the clear coating film obtained by the curing of the clear layer (B) will have poor coating film properties as a whole. On the other hand, if the isocyanato-group-containing (meth)acrylic compound (B1e) is more than 0.8 equivalent with respect to the hydroxyl group, the clear coating film obtained by the curing of the clear layer (B) will have poor coating film properties, for example, in terms of appearance.

[2-2] Urethane-Based Oligomer (B2)

The urethane-based oligomer (B2) is not particularly limited, provided that the urethane-based oligomer (B2) has a polymerizable double bond that allows radical polymerization. The polymerizable double bond is introduced into the urethane-based oligomer (B2) by using urethane-bond. Specifically, it is preferable that a weight average molecular weight Mw of the urethane-based oligomer (B2) is not less than 500, and not more than 30,000. It is more preferable that the weight average molecular weight Mw of the urethane-based oligomer (B2) is not less than 1,000 and not more than 20,000. If the weight average molecular weight Mw is less than 500, shrinkage of the clear film (B) in curing becomes large. In this case, there is a possibility that the clear coating film obtained by curing the clear layer (B) would not attain surface smoothness. Moreover, if the weight average molecular weight Mw is less than 500, the clear layer (B) will have a poor flexibility. Thus, the weight average molecular weight Mw of less than 500 is not preferable. On the other hand, if the weight average molecular weight Mw is more than 30,000, the urethane-based oligomer (B2) will have low compatibility with respect to the other component contained in the clear coating material. This would result turbidness in the clear coating film, and a low tensile strength. Thus, the weight average molecular weight Mw of more than 30,000 is not preferable.

Moreover, it is preferable that the urethane-based oligomer (B2) have six or less polymerizable double bonds per molecule. If the urethane-based oligomer (B2) has more than six polymerizable double bonds per molecule, the clear layer (B) has a poor flexibility.

The urethane-based oligomer (B2) is not particularly limited, provided that it is arranged as above. One kind of the urethane-based oligomer (B2) may be used solely, or two or more kinds of the urethane-based oligomer (B2) may be used in combination. Specific examples of the urethane-based oligomer (B2) are: Ebecryl EB8804/10EA (Mw=1,000, polymerizable double bond number (a number of the polymerizable double bonds)=2, made by Daicel UCB Co., Ltd.), UV 7000B (Mw=3,500, polymerizable double bond number=2, made by Nippon Gosei Kagaku Kogyo Co. Ltd.), UF8001 (Mw=3,200, polymerizable double bond number=2, made by Kyoeisha Chemical Co., Ltd.), UA306H ($M_w$=1000 or more, polymerizable double bond number=6, Kyoeisha Chemical Co., Ltd.), and similar compounds.

Based on 100 part by mass of a sum amount (B1+B2) of the acrylic-based polymer (B1) and the urethane-based oligomer (B2) by solid contents by mass, a lower limit of the urethane-based oligomer (B2) content (solid content by mass) is preferably 30 parts or more by mass, and more preferably 40 parts or more by mass. Furthermore, based on 100 part by mass of the sum amount (B1+B2), an upper limit of the urethane-based oligomer (B2) content (solid content by mass) is preferably 70 parts or less by mass, and more preferably 60 parts or less by mass.

In a case where the urethane-based oligomer (B2) content (solid content by weight) is less than 30 parts by mass (the acrylic-based polymer (B1) content (solid content by weight) is more than 70 parts by mass) based on 100 parts by mass of the sum amount (B1+B2), there is a possibility that the clear layer (B) and the clear coating film would be poor in the flexibility. Thus, the urethane-based oligomer (B2) content of less than 30 parts by mass is not preferable. On the other hand, if the urethane-based oligomer (B2) content (solid content by weight) exceeds 70 parts by mass (the acrylic-based polymer (B1) content (solid content by weight) is less than 30 parts by mass), the clear layer (B) and the clear coating film become sticky, thereby making it difficult to form the laminate film excellently; or to decorate the article with the laminate film excellently. Further, if the urethane-based oligomer (B2) content (solid content by weight) exceeds 70 parts by mass, the clear coating film would possibly poor in coating film properties.

[2-4] Polymerization Initiator (B3)

The clear coating material may comprise a polymerization initiator (B3) in addition to the acrylic-based polymer (B1) and urethane-based oligomer (B2). The polymerization initiator (B3) is not particularly limited, but may be an electromagnetic beam polymerization initiator, a thermocuring radical polymerization initiator, or the like. Polymerization of the electromagnetic beam polymerization initiator is initiated by electromagnetic beams such as ultraviolet rays, electron beams and other similar beams.

Examples of the electromagnetic beam polymerization initiator are ultraviolet curing polymerization initiators such as: benzoin-type compounds such as benzoin methyl ether and similar compounds; anthraquinone-type compounds such as 2-ethylanthraquinone and similar compounds; benzophenone-type compounds such as benzophenone and similar compounds; sulfide-type compounds such as diphenyl sulfide and similar compounds; thioxanthone-type compounds such as 2,4-dimethylthioxanthone and similar compounds; acetophenone-type compounds such as 2,2-dimethoxy-2-phenylacetophenone and similar compounds; phosphinoxide-type compounds such as 2,4,6-trimethylbenzoindiphenylphosphinoxide and similar compounds; Irgacure (Registered Trademark)-184, Irgacure-819 (which are both made by Chiba Specialty Chemicals K.K.); and other similar compounds. One of them, or a combination of two or more of them may be used as the polymerization initiator.

The thermocuring radical polymerization initiator may be, for example, an organic peroxides or the like. Examples of the organic peroxides are t-amylperoxy-2-ethylhexanoate, bis(4-t-butylcyclohexyl)peroxydicarbonate, Trigonox (Registered Trademark) 121-50 (made by Kayaku Akzo Corp.), and similar compounds. One of the organic peroxides, or two or more of the organic peroxides may be used as the thermocuring radical polymerization initiator.

Based on 100 part by mass of the sum amount (B1+B2) of the acrylic-based polymer (B1), and the urethane-based oligomer (B2) by solid contents by mass, a lower limit of polymerization initiator (B3) content is 0.1 part or more by mass preferably, and 1 part or more by mass more preferably. Moreover, based on 100 part by mass of the sum amount (B1+B2), an upper limit of the polymerization initiator (B3) content is 10 parts or less by mass preferably, and 7 parts or less by mass more preferably.

If the polymerization initiator (B3) content is less than 0.1 parts by mass, it will become impossible to sufficiently cure the clear layer. Thus, the resultant clear coating film would be possibly poor as a coating film, in terms of tensile strength, after-fracture elongation, non-stickiness, and other properties. On the other hand, if the polymerization initiator (B3) content is more than 10 parts by mass, there is a possibility that unreacted polymerization initiator (B3) would be left over in the clear coating film. This unreacted polymerization initiator (B3) would deteriorate the clear coating film by sunlight in outdoor, thereby deteriorating the clear coating film in the weatherability.

<Other Components>

The clear coating material, which contains the acrylic-based polymer (B1), the urethane-based oligomer (B2), and the polymerization initiator (B3) may be so arranged as to further contain a compound that is generally added in coating materials. Such other component may be: binder resin or a cross-linking agent such as modified acrylic resin, polyester resin, epoxy resin, melamine resin, polyisocyanate compounds, block polyisocyanate compounds, and similar compounds; an ultraviolet ray absorbing agent (UVA) such as Tinubin (Registered Trademark) 400,900,1130 (made by Chiba Specialty Chemicals K.K.) and similar compounds; a light stabilizer (HALS) such as Sanol (Registered Trademark) LS292, LS770 (made by Sankyo Co., Ltd.), Tinubin 123 (made by Chiba Specialty Chemicals K.K.); polyfunctional monomers such as polyethylene glycoldi(meth)acrylate, NK ester 2G (Made by Shin-Nakamura Chemical Co., Ltd.), trimethylolpropantri(meth)acrylate, pentaerythritoltetra-(meth)acrylate, and similar compounds. Besides those, a leveling agent, a defoaming agent, a polymerization inhibitor, and/or the like may be added to the clear coating material, according to needs.

Furthermore, the clear coating material may contain a solvent for mixing each component or adjusting viscosity. The solvent may be a well-known organic solvent for use in coating material, such as an organic solvent of ester type, an organic solvent of ether type, an organic solvent of alcohol type, an organic solvent of amid type, an organic solvent of ketone type, an organic solvent of aliphatic hydrocarbon type, an organic solvent of cycloaliphatic hydrocarbon type, an organic solvent of aromatic hydrocarbon type, and like organic solvent. Those organic solvents may be used solely or two or more of the organic solvents may be used in combination. In case where the solvent is used, it should be noticed the following point: if a volatile material is left over in the laminate film, the volatile material would be possibly volatilized off in decorating the base material with the laminate film, thereby causing a pin hole or swelling. Therefore, it is preferable that an amount of the volatile material in the laminate film be sufficiently low.

Moreover, in the case of the arrangement in which the clear coating material contains the polymerization initiator (B3) or the other component, it is preferable that the sum solid contents (B1+B2) by mass of the acrylic-based polymer (B1) and the urethane-based oligomer (B2) be 80 parts or more by mass based on 100 parts by mass of the clear coating material. If the sum amount (B1+B2) is less than 80 parts by mass based on 100 parts by mass of the clear coating material, it will become difficult to form the clear layer (B), whereby the clear coating film would have poor coating film properties.

[3] Color Layer (C)

The color layer (C) gives higher ornamental property to the article by giving a desired colored appearance to the article. Moreover, the color layer (C) hides a background surface of the article, thereby keeping an aesthetic appearance of the article in a good quality. The color layer (C) in the laminate film is cured to the color coating film by application of the electromagnetic beams or heat after placing the laminate film on the article.

The color layer (C) contains a color coating material. The color coating material preferably contains at least acrylic resin (C1), urethane resin (C2) and a color pigment (C3). The color coating material may further contains an other component in addition to these components mentioned above. The other component may be an ultraviolet ray absorbing agent (UVA), a light stabilizer (HALS), binder resin, a cross-linking agent, a pigment, a leveling agent, a defoaming agent, a conductive filler, a solvent, and/or the like. The color coating material may be electro-magnetically curable, or may be the thermoplastic or thermally curable (thermohardening). The following explains the component to be contained in the color coating material.

<Acrylic Resin (C1)>

The acrylic resin (C1) to be contained in the color coating material is not particularly limited. However, it is preferable that the acrylic resin (C1) have a weight average molecular weight Mw not less than 3,000 and not more than 30,000. It is more preferable that the acrylic resin (C1) have a weight average molecular weight Mw not less than 10,000 and not more than 20,000. If the acrylic resin (C1) has a weight average molecular weight Mw of less than 3,000, the color layer (C) tends to have a low tensile strength. On the other hand, it is difficult to produce the color coating material (C) if the acrylic resin (C1) has a weight average molecular weight Mw of more than 30,000 and the acrylic resin (C1) having a weight average molecular weight Mw of more than 30,000 has a poor compatibility with the other components contained in the color coating material than the acrylic resin (C1).

Moreover, it is preferable that the acrylic resin (C1) have a glass transition temperature of 0° C. or more. It is more preferable that the acrylic resin (C1) have a glass transition temperature of 40° C. or more. Furthermore, it is preferable that the acrylic resin (C1) have a glass transition temperature of 100° C. or less. It is more preferable that the acrylic resin (C1) has a glass transition temperature of 70° C. or less. If the acrylic resin (C1) has a glass transition temperature less than 0° C., the color layer (C) has a low tensile strength. On the other hand, if the acrylic resin (C1) has a glass transition temperature more than 100° C., it becomes difficult to attain a laminate film having an aesthetic appearance having a high flip-flop property, or being twinkled like mica.

<Urethane Resin (C2)>

The urethane resin (C2) to be contained in a color coating material is not particularly limited. However, it is preferable that the urethane resin (C2) have a weight average molecular weight $M_w$ not less than 10,000 and not more than 100,000. It is more preferable that the urethane resin (C2) have a weight average molecular weight Mw not less than 40,000 and not more than 60,000. If the weight average molecular weight $M_w$ is less than 10,000, the color layer (C) would be poor in flexibility. If the weight average molecular weight $M_w$ is more than 100,000, it would become difficult to produce the color coating material.

Furthermore, it is preferable that the urethane resin (C2) contain at least one of a OH group, a COOH group, and a $NH_2$ group. It is especially preferable that the urethane resin contain a OH group.

<Color Pigment (C3)>

A color pigment (C3) to be contained in the color coating material is not particularly limited, and may be a color pigment in general use. Examples of the color pigment (C3) are: inorganic pigments such as titanium oxide, carbon black, iron oxide-based pigment, chromium oxide, and the like; organic pigments such as a pigment of azo type, a pigment of anthracene type, a pigment of perylene type, a pigment of quinacridone type, a pigment of indigo type, a pigment of phthalocyanine type, a pigment of isoindolynone, a pigment of diketopyroropyrole type, a pigment of benzimidazolon type, a pigment of dioxane type, and the like; metal-type pigments in which a metallic shining material made of a metal, an alloy and/or the like, such as coating aluminum, aluminum flakes, copper, zinc, nickel, tin, aluminum oxide, and the like; a mica pigment such as interfering mica, white mica and the like; and the like pigment. The color pigment (C3) may be one of these or a combination of two or more of these.

<Other Components>

The binder resin and the cross-linking agent, which are the other component contained in the color coating material, may be, for instance, modified acrylic resin, polyester resin, epoxy resin, melamine resin, polyisocyanate compound, block isocyanate compound or the like. Moreover, a solvent to be contained in the color coating material may be an organic solvent used in the coating material in general, such as a solvent of ester type, a solvent of ether type, a solvent of alcohol type, a solvent of ketone type, a solvent of aliphatic hydrocarbon type, a solvent of aromatic hydrocarbon type, or the like. These solvent may be used solely, or two or more of them may be used in combination.

[4] Adhesive Agent Layer

The adhesive agent layer is used for firmly adhering the laminate film on the surface of the article in making the decorative appearance of the article by the laminate film.

An adhesive agent to be contained in the adhesive agent layer is not particularly limited, provided that the adhesive agent is a known adhesive agent. For example, the adhesive agent may be Byrone (Registered Trademark) UR3200 (Toyobo Co., Ltd.), UR-1361ET (Aron Ever-grip Co. Ltd.), and similar compounds.

[5] Inner Film Layer

An inner film layer is provided to the laminate film if necessary. The inner film layer prevents the adhesive agent layer from sticking with the guard film layer (A) while the laminate film is stored in a roll form. There is no particular limitation in which kind of inner film is used as the inner film layer. Examples of the inner film are: a polyethylene film, a polypropylene film, a co-extruded polyethylene/polypropylene film, a laminate polyethylene/polypropylene film, and a oriented polyethylenterephthalate film, and like film.

Specific examples of the inner films are Tohcello (Registered Trademark) TAF-511 (made by Tohcello Co., Ltd.), BO-2500 (made by Toray Industries Inc.), and similar compounds.

The inner film layer is peeled off in decorating the article. Thus, the inner film layer may have a surface that has been subjected to peel-off treatment, in order to be strippable (peeled off) appropriately.

[Production Method for Laminate Film]

The clear coating material and the color coating material are used by being dissolved in an appropriate solvent. Therefore, the components to be contained in the clear coating material are mixed in an appropriate solvent, as described above, in order to prepare a clear coating material solution. Moreover, the color coating material is prepared in a similar manner: components to be contained in the color coating material is mixed in an appropriate solvent, so as to prepare a color coating material solution.

Next, the clear coating material solution is applied onto the guard film layer (A) so that the clear layer (B) having the desired thickness will be obtained. There is no particular limitation in how to apply the clear coating material solution. For example, the clear coating material solution may be applied (i) by the spray coating in which a spray is used, (ii) by using an applicator, a bar coater, a die coater, a comma coater, a roller brush, a brush, a spatula, or the like (iii) or the like applying (coating) method. Of those, the use of the applicator is especially preferable to apply the clear coating material solution. A film thus prepared by applying the clear coating material solution by any one of those applying methods is dried by heating so as to evaporate the solvent from the clear coating material solution. Thereby, the clear layer (B) is formed.

Then, the color coating material solution is applied on the clear layer (B) so that the color layer (C) having the desired thickness will be obtained. There is no particular limitation in how to apply the color coating material solution. For example, the color coating material solution may be applied (i) by the spray coating in which a spray is used, (ii) by using the applicator, the bar coater, the die coater, the roll coater, the comma coater, the roller brush, the brush, the spatula, or the like (iii) or the like applying (coating) method. After the color coating material solution is applied, A film thus prepared by applying the color coating material solution in this way is dried by heating so as to evaporate the solvent from the color coating material solution. Thereby, the color layer (C) is formed.

Next, the adhesive agent is applied thereon so that the adhesive agent layer having the desired thickness will be attained. There is no particular limitation in how to apply the adhesive agent. For example, the adhesive agent may be applied (i) by the spray coating in which a spray is used, (ii) by using an applicator, a die coater, the bar coater, the roll coater, the comma coater, the roller brush, the brush, the spatula or the like, (iii) or the like applying (coating) method. The adhesive agent layer is obtained by drying the thus applied adhesive agent by heating. Then, if necessary, the inner film layer is formed by providing the inner film by using as a rubber role (roller) or the like. In this way, the laminate film of the present invention is obtained.

There is no particular limitation in how to make the decorative appearance of the article by using the laminate film thus prepared. Therefore, the making of the decorative appearance of the article may be carried out in the same way as a conventional well known art. Specifically, first, the inner film layer is peeled from the laminate film. Then, the laminate film is adhered on the surface of the article in such a manner that the adhesive agent layer faces the surface of the article so that the laminate film is adhered with the surface of the article with no space therebetween. After that, an electromagnetic wave or heat is applied thereon so as to cure the clear layer (B) and the color layer (C), thereby obtaining the clear coating film and the color coating film respectively from the clear layer (B) and the color layer (C). It is preferable that the adhering the laminate film on the article be carried out under vacuum.

In this way, the decorated article (article having the decorative appearance) is obtained, the decorated article having the color coating layer and the clear coating layer on the surface of the article in this order, and the guard film layer (A) as a outermost layer.

There is no particular limitation in the article which can be appropriately decorated with the laminate film of the present invention. For example, the laminate film of the present invention may be used for: automobile parts such as bumpers, front under spoilers, rear under spoilers, side under skirts, side garnishes, side mirrors; bodies of home electric appliances such as cell-phones, audio apparatuses, refrigerators, fan heaters, lighting apparatuses, and the like; wash stands, vanities, basins and the like; and other products.

The present invention is not limited to the embodiments described above, and may be variously modified within the scope of the claims. The technical scope of the present invention includes embodiments obtained by appropriately combining the technical features disclosed respectively in the different embodiments.

EXAMPLES

The present invention will be described in detail with reference to Examples and Comparative Examples, to which the present invention is not limited.

Measurement of weight-average molecular weight $M_w$, calculation of glass transition temperature, calculation of hydroxyl group value (OHV), evaluation of the clear layer (B), evaluation of the laminate film, and production of the acrylic-based polymer (B1) were carried out as follows.

[Measurement of Weight-Average Molecular Weight $M_w$]

The weight-average molecular weight $M_w$ of each polymer was measured as the standard polystyrene equivalent by gel permeation chromatography. In the measurement, columns used were gel pack R400, R450, R400M (respectively used by Hitachi Chemical Co., Ltd.). An elution solution used was tetrahydrofuran. A chromatographer used was Hitachi L6000 high speed liquid chromatographer. A detector used was Hitachi L3350 differential refractometer. The measurement was carried out with column temperature of 40° C., sample concentration of 0.1 g/5 mL, and a flow rate of 2 mL/min.

[Calculation of Glass Transition Temperature]

Glass transition temperatures Tg were calculated out by using the following formula:

$$1/Tg=\Sigma(Wn/Tn),$$

based on mass fractions Wn of the respective components and glass transition temperatures Tn (literature value) of respective polymers of the components.

[Calculation of Hydroxyl Group Value (OHV)]

hydroxyl group value (OH1) of the adduct that was the compound before adding the isocyanato-group-containing (meth)acrylic compound (B1e) was calculated by the following formula:

$$OH1=\{(B1d1[\text{part by mass}]+B1c(d1)\,[\text{part by mass}])\times \\ (\text{hydroxyl group value [mgKOH/g] of } B1ad1)\}+\{ \\ (B1d2[\text{part by mass}]+B1c(d2)[\text{part by mass}])\times \\ (\text{hydroxyl group value [mgKOH/g] of } B1ad2)\}+ \\ (B1b2[\text{part by mass}]\times\text{hydroxyl group value} \\ [\text{mgKOH/g] of } B1ad2)/(B1c[\text{part by mass}]+B1d1 \\ [\text{part by mass}]+B1d2[\text{part by mass}]).$$

(the reference symbols in the formula will be explained later.)

Next, isocyanato-group-containing (meth)acrylic compound content (equivalent B1e), which was equivalent to the hydroxyl group in the adduct was calculated out by the following equation:

$$\text{Equivalent } B1e[\text{part by mass}]=\{42\times(B1c[\text{part by mass}]+B1d1[\text{part by mass}]+B1d2[\text{part by mass}])\times OH1\}/\{561\times(\text{isocyanato group content in } B1e\,(\text{mass \%}))\}.$$

(the reference symbols in the formula will be explained later.)

Finally, hydroxyl group value (OH2) in the acrylic-based polymer (B1) was calculated by the following equation:

$$OH2=[\{OH1\times(B1c[\text{part by mass}]+B1d1[\text{part by mass}]+B1d2[\text{part by mass}])\}\times\{1-(B1e[\text{part by mass}]/\text{equivalent } B1e[\text{part by mass}])\}/(B1c[\text{part by mass}]+B1d1[\text{part by mass}]+B1d2[\text{part by mass}]+B1e[\text{part by mass}])].$$

In the equations:

B1d1 is the long-chain unsaturated carboxylic acid;

B1d2 is the short-chain unsaturated carboxylic acid;

B1c is the epoxy-group-containing copolymer;

B1c(d1) is epoxy-group-containing unsaturated compound (B1a) having the same number of moles as the long-chain unsaturated carbolic acid (B1d1);

B1c(d2) is the epoxy-group-containing unsaturated compound (B1a) having the same number of moles as the short-chain unsaturated carbolic acid (B1d2);

B1ad1 is the adduct prepared by mixing the long-chain unsaturated carboxylic acid (B1d1) and the epoxy-group-containing unsaturated compound;

B1ad2 is the adduct prepared by mixing the short-chain unsaturated carbolic acid (B1d2) and the epoxy-group-containing unsaturated compound;

B1b2 is the unsaturated compound (B1b) having the hydroxyl group;

B1e is the isocyanato-group-containing (meth)acrylic compound.

[Evaluation of Clear Layer (B)]

The clear layer (B) was evaluated in the following points.

<Evaluation of Clear Coating Material in Compatibility>

50 mL of clear coating material solutions, which will be later described, were added in test tubes for visual inspection of turbidness. If the clear coating material solution was not turbid, the clear coating material was regarded as "pass" (○). If the clear coating material solution was turbid even a little, the clear coating material was regarded as "fail" ((x)).

<Non-Stickiness>

A later-described (A+B) layer film was dried for 15 minutes at 80° C., and let stand for 5 minutes at 25° C. Then, the clear layer (B) of the (A+B) layer film was evaluated by touching it with a finger as to whether or not it was sticky. If it was not sticky, the clear layer (B) was judged as having a non-sticky surface, and regarded as "pass" (○). If it was sticky, the clear layer (B) was judged as having a sticky surface and regarded as "fail" (x).

<Evaluation in Universal Hardness>

A clear coating film was prepared by curing the clear layer (B) of the later-described (A+B) layer film by radiating ultraviolet rays of light intensity of 2000 mJ/cm$^2$ by using a high-pressure mercury lamp of 80 W/cm$^2$. Then, by using Fischer scope H-100 (made by Fischer Instruments K.K.), a maximum depth of push-down concave shape of the clear coating film was measured. The push-down concave shape of the clear coating film was formed by placing a weight load to add a weight of 5 mN on the surface of the clear coating film for 30 seconds at a temperature of 25° C. A hardness was calculated from the maximum depth thus obtained, thereby determining the universal hardness (N/mm$^2$).

<Evaluation in After-Tearing Elongation>

The clear layer (B) and the clear coating film prepared by curing the clear layer (B) were evaluated in after-tearing elongation (%) in the following manner.

The clear coating material solution was applied on a lumilar (Registered Trademark) S-10 (made by Toray Industries Inc.; which is a PET based film) so that the clear coating layer (B) having a 40 μm thickness would be obtained after dried. Then, the clear coating material solution thus applied was dried at 80° C. for 15 minutes, thereby obtaining a dry sample. The dry sample was cut into a size of 10 mm×50 mm. Further, the lumilar S-10 was peeled off, thereby obtaining sample for use in evaluation of the clear layer (B).

Next, the after-tearing elongation of the uncured sample was evaluated by using the above-mentioned Tensilon HTM-500. The after-tearing elongation was measured when the sample for use in evaluation of the clear layer (B) was torn by being pulled at 80° C. and at a pulling rate of 50 mm/min, until tear.

The lumilar S-10 was placed on the clear layer (B) of the dry sample. Then, by using a high-pressure mercury lamp of 80 W/cm$^2$, a ultraviolet ray having a light intensity of 2000 mJ/cm$^2$ was irradiated on the dry sample on which the lumilar S-10 was placed. Thereby, the clear layer (B) was cured. Then, the clear coating film obtained by curing the clear layer (B) was cut into a size of 10 mm×50 mm, and the lumilar S-10 were peeled off from both sides of the clear coating film, thereby obtaining a sample for use in evaluating the clear coating film.

Next, in the same manner as above, by using the above-mentioned Tensilon HTM-500, the sample for use in evaluating the clear coating film was evaluated in terms of the after-tearing elongation. The after-tearing elongation was measured when the sample for use in evaluating the clear coating film was torn by being pulled at 20° C. and at a pulling rate of 50 mm/min, until tear.

[Evaluation of Laminate Films]

A sample piece and a comparative sample piece respectively decorated with a laminate film and a comparative laminate film prepared in a later-described manner were evaluated in the following points.

<Shape-Forming Property (Followability)>

Visual evaluation was conducted on the laminate film or the comparative laminate film on the sample piece or the comparative sample piece, in terms of evenness and reproducibility of the shape of the base article. If no defect was found in the evenness and reproducibility of the shape of the base article, it was judged the sample piece or the comparative sample piece was "pass" (○). If any defect was found in terms of any of evenness and reproducibility of the shape of the base article, it was judged that the sample piece or the comparative sample piece was "fail" (x).

<Initial Firm Adhesion>

In accordance with JIS K5600-5-6, the sample piece and the comparative sample piece were evaluated. If the laminate film or the comparative laminate film was not peeled off, it was judged the sample piece or the comparative sample piece was "pass" (○). If the laminate film or the comparative laminate film was peeled off, it was judged that the sample piece or the comparative sample piece was "fail" (x).

<Water Resistance>

In accordance with JIS K5600-6-1, the sample piece and the comparative sample piece were immersed in water for ten days. After the immersion, if there was no defect in appearance of the sample piece or the comparative sample piece and the laminate film or the comparative laminate film was not peeled off, it was judged the sample piece or the comparative sample piece was "pass" (○). If there was a defect in appearance of the sample piece or the comparative sample piece, or if the laminate film or the comparative laminate film was peeled off, it was judged that the sample piece or the comparative sample piece was "fail" (x).

<Gasohol Resistance>

The sample piece and the comparative sample piece were cut into a size of 30 mm×40 mm. Edges of the sample piece and the comparative sample piece in the size of 30 mm×40 mm were cut at 45° from a coating surface on which the laminate film or the comparative laminate film was placed. Thereby, an evaluation samples were obtained.

Then, the evaluation samples were put into a vessel containing a gasohol solution so that approximately ½ of the coating surface of the evaluation samples were immersed in the gasohol solution. Then, the vessel was sealed by putting a glass board on the vessel, so that the gasohol solution would not be evaporated off. The gasohol solution was a mixture of regular gasoline (by Showa Shell Sekiyu K.K.) and ethanol (first class) in a volumetric ratio of regular gasoline/ethanol of 90/10. Keeping the temperature of the gasohol solution at 20±1° C., a time was measured until the laminate film or the comparative film of the coating surface of the evaluation samples were lifted up by 2 mm from the edge. If it took 60 minutes or more time, it was judged that the evaluation-sample was "pass" (○). If it took less than 60 minutes, it was judged that the evaluation sample was "fail" (x).

<Hardness>

In accordance with JIS K5699-5-4, pencil hardness test was conducted. If the evaluation sample was as hard as HB or harder, it was judged that the evaluation-sample was "pass" (○). If the evaluation sample was softer than HB, it was judged that the evaluation sample was "fail" (x).

<Flexibility>

In accordance with JIS K5600-5-1, the evaluation-samples were evaluated by using a mandrel of 32 mm in diameter. If no crack was observed, it was judged that the evaluation-sample was "pass" (○). If any crack was observed, it was judged that the evaluation-sample was "fail" (x).

Example of Production of Acrylic-Based Polymer (B1)

<Synthesis of Epoxy-Group-Containing Copolymer (B1c)>

Solvent (I) respectively in amounts as shown in Tables 1 and 2 were charged in reaction vessels. Then, under agitation the solvent (I) were heated up to 110° C. and under nitrogen gas atmosphere. Next, under temperature condition of 110° C., a mixture (II) was dropped into each solvent (I), taking 2 hours to finish. The mixture (II) contained 2,3-epoxy propyl methacrylate, an unsaturated compound (B1b) and perbutyl O (Registered Trademark)) (by NOF Corp.), respectively in amounts as shown in Tables 1 and 2. 2,3-epoxypropyl-methacrylate was an epoxy-group-containing unsaturated compound (B1a). After the dropping was finished, the mixtures thus obtained were reacted for 1 hour under temperature condition of 110° C. Then, mixed solvents (III) containing solvents in amounts shown in Tables 1 and 2 were dropped in the mixtures. After that, the mixtures were heated up to 145° C. and further reacted for 2 hours, and then cooled down to 110° C. or lower. Next, solutions (IV) respectively in amounts as shown in Tables 1 and 2 were added to the mixtures. In this way, precursors (1) to (20), which were epoxy-group-containing copolymers (B1c), and comparative precursors (1) and (2) were obtained.

The thus obtained precursors (1) to (20) and comparative precursors (1) and (2) had weight-average molecular weights, glass transition temperatures, solid content by weight as shown in Tables 1 and 2.

TABLE 1

| | | | Precursor | | | | | | | | | | | |
|---|---|---|---|---|---|---|---|---|---|---|---|---|---|---|
| | | (M) | (1) | (2) | (3) | (4) | (5) | (6) | (7) | (8) | (9) | (10) | (11) | (12) |
| (I) | Toluene (g) | | 70 | 70 | 70 | 70 | 70 | 70 | 70 | 70 | 70 | 70 | 70 | 70 |
| (II) | Glycidyl Methacrylate (g) | 142 | 30 | 30 | 30 | 30 | 30 | 10 | 30 | 22.5 | 24.6 | 25.4 | 59.4 | 24.1 |
| | Methyl Methacrylate (g) | 100 | 35.8 | 35.8 | 35.8 | 31.8 | 6 | 50 | 35.8 | 55.5 | 52 | 49.6 | — | 51.4 |
| | Isobonyl Methacrylate (g) | 222 | 34.2 | 34.2 | 34.2 | 24.2 | 64 | 33 | 34.2 | 22 | 23.4 | 25 | — | 24.5 |
| | Butyl Acrylate (g) | 128 | — | — | — | 14 | — | 5 | — | — | — | — | — | — |
| | Dicyclopentanyl Methacrylate (g) | 264 | — | — | — | — | — | — | — | — | — | — | 26.6 | — |
| | 2-Hydroxyethyl Methacrylate (g) | 130 | — | — | — | — | — | 2 | — | — | — | — | 14 | — |
| | Perbutyl O (g) | | 0.6 | 2 | 0.3 | 0.4 | 0.4 | 0.4 | 0.4 | 0.4 | 0.4 | 0.4 | 0.4 | 0.4 |
| (III) | Toluene (g) | | 25 | 25 | 25 | 25 | 25 | 25 | 25 | 25 | 25 | 25 | 25 | 25 |
| | Perbutyl O (g) | | 1 | 1 | 1 | 1 | 1 | 1 | 1 | 1 | 1 | 1 | 1 | 1 |
| (IV) | Toluene (g) | | 29 | 29 | 29 | 29 | 29 | 29 | 29 | 29 | 29 | 29 | 29 | 29 |
| Weight-Average Molecular Weight (× 1,000) | | | 60 | 20 | 150 | 110 | 110 | 110 | 110 | 110 | 110 | 110 | 110 | 110 |
| Glass transition temp. (° C.) | | | 97 | 97 | 97 | 60 | 110 | 97 | 97 | 97 | 97 | 97 | 70 | 97 |
| Solid Content By Weight (%) | | | 46.5 | 46.5 | 45.7 | 45.8 | 46.5 | 45.7 | 45.7 | 46.5 | 45.7 | 45.8 | 46.5 | 45.7 |

TABLE 2

| | | | Precursor | | | | | | | | Comparative Precursor | |
|---|---|---|---|---|---|---|---|---|---|---|---|---|
| | | (M) | (13) | (14) | (15) | (16) | (17) | (18) | (19) | (20) | (1) | (2) |
| (I) | Toluene (g) | | 70 | 70 | 70 | 70 | 70 | 70 | 70 | 70 | 70 | 70 |
| (II) | Glycidyl Methacrylate (g) | 142 | 24.1 | 24.1 | 9.6 | 73.8 | 22.3 | 24.7 | 19.7 | 73 | 24.1 | 24.1 |
| | Methyl Methacrylate (g) | 100 | 36.9 | — | 55.4 | — | 57.7 | 50.3 | 64.3 | — | 51.4 | 51.4 |
| | Isobonyl Methacrylate (g) | 222 | 15 | — | 30 | — | 20 | 25 | 16 | — | 24.5 | 24.5 |
| | Butyl Acrylate (g) | 128 | 24 | — | 5 | — | — | — | — | — | — | — |
| | Dicyclopentanyl Methacrylate (g) | 264 | — | 75.9 | — | 15.2 | — | — | — | — | — | — |
| | 2-Hydroxyethyl Methacrylate (g) | 130 | — | — | — | 11 | — | — | — | 27 | — | — |
| | Perbutyl O (g) | | 0.4 | 0.4 | 0.4 | 0.4 | 0.4 | 0.4 | 0.4 | 0.4 | 3 | 0.1 |
| (III) | Toluene (g) | | 25 | 25 | 25 | 25 | 25 | 25 | 25 | 25 | 25 | 25 |
| | Perbutyl O (g) | | 1 | 1 | 1 | 1 | 1 | 1 | 1 | 1 | 1 | 1 |
| (IV) | Toluene (g) | | 29 | 29 | 29 | 29 | 29 | 29 | 29 | 29 | 29 | 29 |
| Weight-Average Molecular Weight (× 1,000) | | | 110 | 110 | 110 | 110 | 110 | 110 | 110 | 110 | 12 | 200 |
| Glass transition temp. (° C.) | | | 40 | 133 | 97 | 57 | 97 | 97 | 97 | 45 | 97 | 97 |
| Solid Content By Weight (%) | | | 45.7 | 45.8 | 46.5 | 45.5 | 45.7 | 46.5 | 45.7 | 45.8 | 46.5 | 46.5 |

Synthesis of Acrylic-Based Polymer (B1)>

The epoxy-group-containing copolymers (B1c) (precursors (1) to (20), and comparative precursors (1) and (2)) were respectively charged into reaction vessels with a long-chain unsaturated carboxylic acid (B1d1), a short-chain unsaturated carboxylic acid (B1d2), and respective solvents in amounts as shown in the column (V) in Tables 3 and 4. Under agitation, mixtures thus obtained were heated up to 90° C., supplying air thereto. Thereby, solutions (V) were obtained. Next, under temperature condition of 90° C., solvents (VI) respectively in amounts as shown in Tables 3 and 4 were added in the respective solutions (V). Then, the solutions (V) with the solvents (VI) respectively added were reacted for one hour. Next, the solutions (V) with the solvents (VI) respectively added were heated up to 105° C. Then, checking acid value of solid contents thereof, the solutions (V) with the solvents (VI) respectively added were reacted at 105° C. until acid value of 8 or less was achieved. The acid value of reaction solutions thus obtained was measured in accordance with JIS K5601-2-1: the reaction solutions were titrated with potassium hydroxide (KOH) of 0.1N, and the acid values were obtained from the following equation using titer thus obtained.

Acid Value={(Titer of KOH solution (mL))×(morality of KOH solution (mol/L))}/(Mass of Solid Content (g)).

After that, solvents (VII) respectively in amounts as shown in Tables 3 and 4 were added the reaction solutions. After the reaction solutions were brought down to 75° C., a mixtures (VIII) containing Karenz MOI (methacryloiloxyethylisocyanate, by Showa Denko) and respective solvents were added into the reaction solutions. Karenz MOI was an isocyanato-group-containing (meth)acrylic compound (B1e). Then, the reaction solutions were reacted at 70° C. for 2 hours, and then cooled down to a temperature of 60° C. or lower. After that, solvents (IX) respectively in amounts shown in Tables 3 and 4 were added into the reaction solutions respectively. In this way, resins (1) to (20), which were acrylic-based polymers (B1), and comparative resins (1) and (2) were obtained.

Tables 3 and 4 show weight-average molecular weights, solid content by weight, and hydroxyl group values of the resins (1) to (20) and comparative resins (1) and (2), and amounts of the long-chain unsaturated carboxylic acids (B1d1) and short-chain unsaturated carboxylic acids (B1d2) used in the synthesis of the resins (1) to (20) and comparative resins (1) and (2). The amounts of the long-chain unsaturated carboxylic acids (B1d1) and short-chain unsaturated carboxylic acids (B1d2) used in the synthesis thereof are expressed by molar quantity (mol %) of the unsaturated carboxylic acids (i.e. B1d1 or B1d2) with respect to total mole of the unsaturated carboxylic acids (i.e. B1d1 and B1d2).

TABLE 3

| | | M | (1) | (2) | (3) | (4) | (5) | (6) | (7) | (8) | (9) | (10) | (11) | (12) |
|---|---|---|---|---|---|---|---|---|---|---|---|---|---|---|
| (V) | Precursor (g) | — | (1) 225.6 | (2) 225.6 | (3) 225.3 | (4) 225.4 | (5) 225.4 | (6) 225.4 | (7) 225.4 | (8) 225.4 | (9) 225.4 | (10) 225.4 | (11) 225.4 | (12) 225.4 |
| | Long-Chain UCA (B1d1) Aronix M5300 (g) | 315 | 34.2 | 34.2 | 34.2 | 34.2 | 34.2 | 11.4 | 33.27 | 10.1 | 44.9 | 46.4 | 27.3 | 27.5 |
| | Short-Chain UCA (B1d2) Methacrylic acid (g) | 86 | — | — | — | — | — | — | 9.08 | — | — | — | — | — |
| | Acrylic Acid (g) | 72 | 7.84 | 7.84 | 7.84 | 7.84 | 7.84 | 2.6 | — | 9.43 | 2.6 | 2.7 | 24.8 | 6.3 |
| | Hydroquinone Monomethyl-ether (g) | — | 0.43 | 0.43 | 0.43 | 0.43 | 0.43 | 0.43 | 0.43 | 0.43 | 0.43 | 0.43 | 0.43 | 0.43 |
| | Toluene (g) | — | 56 | 56 | 56 | 56 | 56 | 20 | 56 | 30 | 30 | 56 | 56 | 56 |
| (VI) | Tetraethyl-ammonium Bromide (g) | — | 0.81 | 0.81 | 0.81 | 0.81 | 0.81 | 0.81 | 0.81 | 0.81 | 0.81 | 0.81 | 0.81 | 0.81 |
| | Toluene (g) | — | 3 | 3 | 3 | 3 | 3 | 3 | 3 | 3 | 3 | 3 | 3 | 3 |
| (VII) | Hydroquinone Monomethyl-ether (g) | — | 0.43 | 0.43 | 0.43 | 0.43 | 0.43 | 0.43 | 0.43 | 0.43 | 0.43 | 0.43 | 0.43 | 0.43 |
| | Toluene (g) | — | 3 | 3 | 3 | 3 | 3 | 3 | 3 | 3 | 3 | 3 | 3 | 3 |
| (VIII) | Karenz MOI | 155 | 16.9 | 10.1 | 10.1 | 10.1 | 16.9 | 1.8 | — | 5.8 | 5.9 | 9.5 | 24.4 | 5.4 |
| | Toluene (g) | — | 5 | 5 | 5 | 5 | 5 | 5 | 30 | 5 | 5 | 5 | 5 | 5 |
| | Dibutyltin Di Laurate | — | 0.043 | 0.043 | 0.043 | 0.043 | 0.043 | 0.043 | — | 0.043 | 0.043 | 0.043 | 0.043 | 0.043 |
| (IX) | Methanol (g) | — | 2 | 2 | 2 | 2 | 2 | 2 | — | 2 | 2 | 2 | 2 | 2 |
| | Toluene (g) | — | 10 | 10 | 10 | 10 | 10 | 10 | — | 10 | 10 | 10 | 10 | 10 |
| | Weight-Average Molecular Weight (× 1,000) | | 150 | 70 | 400 | 200 | 200 | 200 | 200 | 200 | 200 | 200 | 200 | 200 |
| | Hydroxyl Group Value (OHV) (mg KOH/g) | | 37 | 55 | 55 | 55 | 55 | 35 | 83 | 54 | 49 | 42 | 125 | 54 |

TABLE 3-continued

| | M | Resin (1) | (2) | (3) | (4) | (5) | (6) | (7) | (8) | (9) | (10) | (11) | (12) |
|---|---|---|---|---|---|---|---|---|---|---|---|---|---|
| Solid Content by Weight (%) | | 44 | 44 | 44.9 | 44 | 45.7 | 40 | 40 | 41 | 45.6 | 44 | 45.8 | 40 |
| Long-Chain UCA (B1d1) (mol %) | | 50 | 50 | 50 | 50 | 50 | 50 | 50 | 20 | 80 | 80 | 20 | 50 |
| Short-Chain UCA (B1d2) (mol %) | | 50 | 50 | 50 | 50 | 50 | 50 | 50 | 80 | 20 | 20 | 80 | 50 |

Abbreviation: UCA abbreviates Unsaturated Carboxylic Acid

TABLE 4

| | | M | Resin (13) | (14) | (15) | (16) | (17) | (18) | (19) | (20) | Comparative Resin (1) | (2) |
|---|---|---|---|---|---|---|---|---|---|---|---|---|
| (V) | Precursor (g) | — | (13) 225.4 | (14) 225.4 | (15) 225.4 | (16) 225.4 | (17) 225.4 | (18) 225.4 | (19) 225.4 | (20) 225.4 | (1) 228 | (2) 225.6 |
| | Long-Chain UCA (B1d1) | | | | | | | | | | | |
| | Aronix M5300 (g) | 315 | 27.5 | 27.5 | 10.9 | 33.7 | 5 | 50.9 | 22.6 | 83.4 | 27.5 | 27.5 |
| | Short-Chain UCA (B1d2) | | | | | | | | | | | |
| | Methacrylic acid (g) | 86 | — | — | — | — | — | — | — | — | — | — |
| | Acrylic Acid (g) | 72 | 6.3 | 6.3 | 2.5 | 30.8 | 10.5 | 1.2 | 5.2 | 19 | 6.3 | 6.3 |
| | Hydroquinone | | | | | | | | | | | |
| | Monomethylether (g) | — | 0.43 | 0.43 | 0.43 | 0.43 | 0.43 | 0.43 | 0.43 | 0.43 | 0.43 | 0.43 |
| | Toluene (g) | — | 20 | 20 | 20 | 50 | 20 | 35 | 20 | 100 | 56 | 56 |
| (VI) | Tetraethylammonium | | | | | | | | | | | |
| | Bromide (g) | — | 0.81 | 0.81 | 0.81 | 0.81 | 0.81 | 0.81 | 0.81 | 0.81 | 0.81 | 0.81 |
| | Toluene (g) | — | 3 | 3 | 3 | 3 | 3 | 3 | 3 | 3 | 3 | 3 |
| (VII) | Hydroquinone | | | | | | | | | | | |
| | Monomethylether (g) | — | 0.43 | 0.43 | 0.43 | 0.43 | 0.43 | 0.43 | 0.43 | 0.43 | 0.43 | 0.43 |
| | Toluene (g) | — | 3 | 3 | 3 | 3 | 3 | 3 | 3 | 3 | 3 | 3 |
| (VIII) | Karenz MOI | 155 | 5.4 | 5.4 | — | 29.8 | 5.6 | 6.1 | 12 | 32.3 | 5.4 | 5.4 |
| | Toluene (g) | — | 5 | 5 | — | 5 | 5 | 5 | 5 | 5 | 5 | 5 |
| | Dibutyltin Di Laurate | — | 0.043 | 0.043 | — | 0.043 | 0.043 | 0.043 | 0.043 | 0.043 | 0.043 | 0.043 |
| (IX) | Methanol (g) | — | 2 | 2 | — | 2 | 2 | 2 | 2 | 2 | 2 | 2 |
| | Toluene (g) | — | 10 | 10 | 10 | 40 | 10 | 10 | 10 | 30 | 10 | 10 |
| Weight-Average Molecular Weight (× 1,000) | | | 400 | 200 | 200 | 200 | 200 | 200 | 200 | 200 | 20 | 600 |
| Hydroxyl Group Value (OHV) (mg KOH/g) | | | 54 | 54 | 33 | 125 | 56 | 48 | 25 | 132 | 54 | 54 |
| Solid Content by Weight (%) | | | 44.9 | 44 | 40 | 45.3 | 41 | 45.4 | 44.6 | 45.8 | 44 | 44 |
| Long-Chain UCA (B1d1) (mol %) | | | 50 | 50 | 50 | 20 | 10 | 90 | 50 | 50 | 50 | 50 |
| Short-Chain UCA (B1d2) (mol %) | | | 50 | 50 | 50 | 80 | 90 | 10 | 50 | 50 | 50 | 50 |

Abbreviation: UCA abbreviates Unsaturated Carboxylic Acid

Examples 1 to 13

<Preparation of Clear Coating Material Solution>

One of the resins (1) to (12) thus prepared and UV-7000B (by Nippon Gosei Kagaku Kogyo Co. Ltd; Solid content 70% by weight) were charged into a vessel provided with an agitating apparatus. UV-7000B is an urethane-based oligomer (B2). Their amounts to be charged are shown in Table 5 in solid content by weight. Next, the followings were added into the mixture of the acrylic-based polymer (B1) and urethane-based oligomer (B2) in such an amount that total solid content (B1+B2) by weight of them was 100 g: 3 g of photo polymerization initiator "Irgacure-819" (by Chiba Specialty Chemicals K.K.: solid content 100% by weight) as a polymerization initiator (B3), 2 g of Tinubin 400 (by Chiba Specialty Chemicals K.K.: solid content 100% by weight) as a ultraviolet absorbing agent (UVA), 1 g of Tinubin 292 (by Chiba Specialty Chemicals K.K.: solid content 100% by weight) as a light stabilizer (HALS), and 100 g of methylisobutylketone (hereinafter "MIBK"). Then, the mixture was agitated for 30 minutes, thereby obtaining a clear coating material solution. In preparing the clear coating material solutions, compatibilities of the components of the clear coating material were evaluated. Results of the evaluations are shown in Table 6.

<Preparation of Color Coating Material Solution>

Into a vessel provided with an agitating apparatus, 73 g of NBC2050-55 (by Nippon Bee Chemical Co., Ltd; solid content 55% by weight) as an acrylic resin (C1), and 171 g of XE-75-H40 (by Mitsui Takeda Chemicals Inc.; solid content 35% by weight) as a urethane resin (C2) were charged. Further, the followings were added into the vessel: 15 g of 91-0562 Alpaste (by Toyo Aluminum K.K.; solid content 71% by weight) as a color pigment (C3), 2 g of BYK 053 (by BYK Chemy Japan Co., Ltd.; solid content 100% by weight) as a leveling agent, and 76 g of toluene. Then, the mixture was agitated for 30 minutes, thereby obtaining a color coating material solution.

<Preparation of Laminate Film>

The clear coating material solution was applied onto a guard film layer (A) by using a bar coater (in such a manner that a resultant clear layer (B) would have a thickness of 50 μm after dried), and then dried at 80° C. for 10 minutes by using a drying apparatus, thereby obtaining the clear layer (B). Hereinafter, the film thus obtained by forming the clear layer (B) on the guard film layer (A) will be referred to as "(A+B) layer film". The (A+B) layer film was evaluated in terms of surface non-stickiness in the aforementioned manner. Moreover, universal hardness and the after-tearing elongation of the (A+B) layer film were measured in the aforementioned manner. Results thereof are shown in Table 6.

Next, on the (A+B) layer film, the color coating material solution was applied by using a bar coater (in such a manner that a resultant color layer (C) would have a thickness of 30 μm after dried), and then dried at 80° C. for 10 minutes by using the drying apparatus, thereby obtaining the color layer (C). Then, an adhesive agent ("Byrone UR-3200", by Toyobo Co., Ltd.) was applied on the color layer (C) by using a bar coater (in such a manner that a resultant adhesive agent layer would have a thickness of 20 μm after dried), and then dried at 80° C. for 10 minutes by using the drying apparatus, thereby obtaining the adhesive agent layer. In this way, laminate films 1 to 13 were prepared.

Next, by using a vacuum forming apparatus NGF-0912 (by Fu-se Vacuum Forming Co., Ltd.), the laminate films 1 to 13 heated to 85° C. were respectively adhered on surfaces of base articles GTX (by GE plastics) by vacuum forming. On the base articles on which the laminate films were respectively adhered, ultraviolet rays were radiated with accumulated quantity of light of 2000 mJ/cm$^2$ by using UV radiator UV-1286 (by Japan Storage Battery Co., Ltd.), so as to cure the clear layers (B) and the color layers (C) to the clear coating films and the color coating films. After that, the guard films were peeled off. In this ways, test pieces 1 to 13 were prepared. The thus prepared test pieces 1 to 13 were evaluated in terms of shape-forming property, initial firm adhesion, water resistance, gasohol resistance, hardness, and flexibility. Results were shown in Table 6.

TABLE 5

| Examples | Laminate Films/ Test Pieces | Resin (B1) | Resin (B1) (SCW (g)) | Urethane-based Oligomer (B2) (SCW (g)) |
|---|---|---|---|---|
| 1 | 1 | (1) | 50 | 50 |
| 2 | 2 | (2) | 50 | 50 |
| 3 | 3 | (3) | 50 | 50 |
| 4 | 4 | (4) | 50 | 50 |
| 5 | 5 | (5) | 50 | 50 |
| 6 | 6 | (6) | 50 | 50 |
| 7 | 7 | (7) | 50 | 50 |
| 8 | 8 | (8) | 50 | 50 |
| 9 | 9 | (9) | 50 | 50 |
| 10 | 10 | (10) | 50 | 50 |
| 11 | 11 | (11) | 50 | 50 |
| 12 | 12 | (12) | 40 | 60 |
| 13 | 13 | (12) | 60 | 40 |
| 14 | 14 | (13) | 50 | 50 |
| 15 | 15 | (14) | 50 | 50 |
| 16 | 16 | (15) | 50 | 50 |
| 17 | 17 | (16) | 50 | 50 |
| 18 | 18 | (17) | 50 | 50 |
| 19 | 19 | (18) | 50 | 50 |
| 20 | 20 | (19) | 50 | 50 |
| 21 | 21 | (20) | 50 | 50 |

Abbreviation: SCW abbreviates Solid Content by Weight.

TABLE 6

| Examples | Compatibility | Non-Stickiness | Universal Hardness (N/mm$^2$) | elongation after tearing(%) Clear Layer(B) | elongation after tearing(%) Clear Coating Film | Shape Forming Property | initial firm adhesion | Water Resistance | Gasohol Resistance | Hardness | Flexibility |
|---|---|---|---|---|---|---|---|---|---|---|---|
| 1 | ○ | ○ | 125 | 670 | 8 | ○ | ○ | ○ | ○ | ○ | ○ |
| 2 | ○ | ○ | 120 | 670 | 8 | ○ | ○ | ○ | ○ | ○ | ○ |
| 3 | ○ | ○ | 125 | 670 | 8 | ○ | ○ | ○ | ○ | ○ | ○ |
| 4 | ○ | ○ | 70 | 530 | 10 | ○ | ○ | ○ | ○ | ○ | ○ |
| 5 | ○ | ○ | 130 | 580 | 7 | ○ | ○ | ○ | ○ | ○ | ○ |
| 6 | ○ | ○ | 105 | 420 | 12 | ○ | ○ | ○ | ○ | ○ | ○ |
| 7 | ○ | ○ | 135 | 550 | 6 | ○ | ○ | ○ | ○ | ○ | ○ |
| 8 | ○ | ○ | 135 | 560 | 6 | ○ | ○ | ○ | ○ | ○ | ○ |
| 9 | ○ | ○ | 110 | 630 | 11 | ○ | ○ | ○ | ○ | ○ | ○ |
| 10 | ○ | ○ | 120 | 620 | 8 | ○ | ○ | ○ | ○ | ○ | ○ |
| 11 | ○ | ○ | 145 | 560 | 5 | ○ | ○ | ○ | ○ | ○ | ○ |
| 12 | ○ | ○ | 65 | 430 | 20 | ○ | ○ | ○ | ○ | ○ | ○ |
| 13 | ○ | ○ | 130 | 540 | 5 | ○ | ○ | ○ | ○ | ○ | ○ |

Examples 14 to 21

In lieu of the resin (1), the resins (13) to (20) were respectively used in amounts shown in Table 5. Except that, the same procedure as in Example 1 was carried out to obtain laminate films 14 to 21. Further, the same procedure as in Example 1 was carried out to obtain test pieces 14 to 21, except that the laminate films 14 to 21 were respectively used in lieu of the laminate film 1.

The thus obtained test piece 14 was excellent in terms of shape-forming property, initial firm adhesion, water resistance, gasohol resistance, and flexibility. The test piece 15 was excellent in terms of initial firm adhesion, water resistance, gasohol resistance, and hardness. Moreover, the test piece 16 was excellent in terms of shape-forming property, initial firm adhesion, water resistance, and flexibility. The test pieces 17 and 18 were excellent in terms of shape-forming property, initial firm adhesion, water resistance, gasohol resistance, and hardness. Further, the test piece 19 was excellent in terms of shape-forming property, initial firm adhesion, water resistance, and flexibility. The test piece 20 was excellent in terms of shape-forming property, initial firm adhesion, water resistance, gasohol resistance, hardness, and flexibility. The test piece 21 was excellent in terms of shape-forming property, initial firm adhesion, gasohol resistance, hardness, and flexibility.

Comparative Examples 1 to 4

In lieu of the resin (1), resins and comparative resins were used respectively in amounts shown in Table 7. Except that, the same procedure as in Example 1 was carried out to obtain comparative laminate films 1 to 4. Moreover, the same procedure as in Example 1 was carried out to obtain comparative test pieces 1 to 4, except that the comparative laminate films 1 to 4 were respectively used in lieu of the laminate film 1.

The thus obtained comparative test piece 1 was insufficient in the shape-forming property. The comparative test piece 2 was insufficient in the compatibility of the clear coating materials. Moreover, the comparative test piece 3 was insufficient in the non-stickiness of the clear layer (B) and failed in terms of the shape-forming property and the hardness. The comparative test piece 4 failed in terms of the flexibility.

TABLE 7

| Comparative Example | Comparative Laminate Film/ Comparative Test Pieces | Resin (B1) | Resin (B1)/ Comparative Resin (Solid Content by Weight (g)) | Urethane-based Oligomer (B2) (Solid Content by Weight (g)) |
|---|---|---|---|---|
| 1 | 1 | Comparative Resin (1) | 50 | 50 |
| 2 | 2 | Comparative Resin (2) | 50 | 50 |
| 3 | 3 | Resin (12) | 20 | 80 |
| 4 | 4 | Resin (12) | 80 | 20 |

A laminate film according to the present invention has a clear layer (B). The clear layer (B) is made of a clear coating material having, at least, an acrylic-based polymer (B1), an urethane-based oligomer (B2), and a polymerization initiator (B3). The acrylic-based polymer (B1) has at least one longer unsaturated double bond group and at least one shorter unsaturated double bond group as side chains, and having a weight-average molecular weight not less than 50,000 but not more than 500,000, the longer unsaturated double bond group introduced in the acrylic-based polymer (B1) by a long-chain unsaturated carboxylic acid having a molecular weight of 150 or more, and the shorter unsaturated double bond group introduced in the acrylic-based polymer (B1) by a short-chain unsaturated carboxylic acid having a molecular weight of less than 150. Acrylic-based polymer (B1) content is not less than 30 parts by mass but not more than 70 parts by mass, based on 100 parts by mass of a total (B1+B2) of solid contents by weight of the acrylic-based polymer (B1) and the urethane-based oligomer (B2). Urethane-based oligomer (B2) content is not less than 30 parts by mass but not more than 70 parts by mass, based on 100 parts by mass of the total (B1+B2).

This improvement in the clear layer (B) gives the laminate film ornamental properties (e.g., transparency, surface smoothness, and high glazing property), and coating film properties (e.g., hardness, mar resistance, non-stickiness, solvent resistance, chemical resistance). Further, the laminate film having the clear layer (B) thus improved shows excellent followability to follow the shape of the coating target article. This excellent followability allows the laminate film to have an even film thickness after decoration. Therefore, this arrangement provides a laminate film excellent in the processability, coating film properties, and ornamental properties, which have been regarded as being incompatible with each other.

Moreover, in addition to the above arrangement, a laminate film according to the present invention is preferably arranged such that the long-chain unsaturated carboxylic acid to be used to introduce the longer unsaturated double bond group is not less than 20 mol % but not more than 80 mol %, based on a total molar quantity of the long-chain unsaturated carboxylic acid and short-chain unsaturated carboxylic acid; and the short-chain unsaturated carboxylic acid to be used to introduce the shorter unsaturated double bond group is not less than 20 mol % but not more than 80 mol %, based on the total molar quantity.

Further, in addition to the above arrangement, a laminate film according to the present invention is preferably arranged such that a precursor of acrylic-based polymer (B1) has a glass transition temperature of not less than 50° C. but not more than 130° C., the precursor having a structure in which the longer and shorter side chains have not been introduced.

Furthermore, in addition to the above arrangement, a laminate film according to the present invention is preferably arranged such that the acrylic-based polymer (B1) has a hydroxyl group value not less than 30 mgKOH/g but not more than 125 mgKOH/g.

Moreover, in addition to the above arrangement, a laminate film according to the present invention is preferably arranged such that the color layer (C) is formed on the clear layer (B).

Further, in addition to the above arrangement, a laminate film according to the present invention is preferably arranged such that the color layer (C) is made of a color coating material comprising at least an acrylic resin (C1), an urethane resin (C2) and a color pigment (C3).

As described above, the laminate film according to the present invention is excellent in processability, coating film properties, and ornamental properties. Thus, an article can be excellently decorated with the laminate film provide by the present invention. Examples of articles that can be excellently decorated with the laminate film according to the present invention encompasses: automobile parts such as bumpers, front under spoilers, rear under spoilers, side under skirts, side garnishes, side mirrors; bodies of home electric appliances such as cell-phones, audio apparatuses, refrigerators, fan heaters, lighting apparatuses, and the like; wash stands, vanities, basins and the like; and other products.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A laminate film comprising:
a guard film layer (A); and
a clear layer (B) formed on the guard film layer (A), the clear layer (B) being made of a clear coating material comprising an acrylic-based polymer (B1), an urethane-based oligomer (B2), and a polymerization initiator (B3), the acrylic-based polymer (B1) being obtained by reacting. (i) an epoxy-group-containing copolymer containing an acrylic resin structure with (ii) a long-chain unsaturated carboxylic acid having a molecular weight of 150 or more and (iii) a short-chain unsaturated carboxylic acid having a molecular weight of less than 150, the epoxy-group-containing copolymer obtained by copolymerization of (a) an epoxy-group-containing unsaturated compound whose molecule has both one epoxy group and a polymerizable unsaturated bond, and (b) an unsaturated compound whose molecule has a polymerizable unsaturated bond, the acrylic-based polymer (B1) having at least one longer unsaturated double bond group and at least one shorter unsaturated double bond group as side chains, and having a weight-average molecular weight not less than 50,000 but not more than 500,000, the longer unsaturated double bond group introduced in the acrylic-based polymer (B1) by the long-chain unsaturated carboxylic acid having a molecular weight of 150 or more, and the shorter unsaturated double bond group introduced in the acrylic-based polymer (B1) by the short-chain unsaturated carboxylic acid having a molecular weight of less than 150, acrylic-based polymer (B1) content being not less than 30 parts by mass but not more than 70 parts by mass, based on 100 parts by mass of a total (B1+B2) of solid contents by weight of the acrylic-based polymer (B1) and the urethane-based oligomer (B2), and urethane-based oligomer (B2) content being not less than 30 parts by mass but not more than 70 parts by mass, based on 100 parts by mass of the total (B1+B2).

2. A laminate film as set forth in claim 1, wherein:

the long-chain unsaturated carboxylic acid to be used to introduce the longer unsaturated double bond group is not less than 20 mol % but not more than 80 mol %, based on a total molar quantity of the long-chain unsaturated carboxylic acid and short-chain unsaturated carboxylic acid; and the short-chain unsaturated carboxylic acid to be used to introduce the shorter unsaturated double bond group is not less than 20 mol % but not more than 80 mol %, based on the total molar quantity.

3. A laminate film as set forth in claim 1, wherein:

a precursor of acrylic-based polymer (B1) has a glass transition temperature of not less than 50° C. but not more than 130° C., the precursor having a structure in which the longer and shorter side chains have not been introduced.

4. A laminate film as set forth in claim 1, wherein:

the acrylic-based polymer (B1) has a hydroxyl group value not less than 30 mgKOH/g but not more than 125 mgKOH/g.

5. A laminate film as set forth in claim 1, wherein:

a color layer (C) is formed on the clear layer (B).

6. A laminate film as set forth in claim 5, wherein:

the color layer (C) is made of a color coating material comprising at least an acrylic resin (C1), an urethane resin (C2) and a color pigment (C3).

7. A laminate film as set forth in claim 5, further comprising:

an adhesive agent layer on the color layer (C).

8. A laminate film as set forth in claim 7, further comprising:

an inner film layer on the adhesive agent layer.

9. The laminate film as set forth in claim 1, wherein the epoxy-group-containing unsaturated compound is an epoxy-group-containing (meth)acrylate.

10. The laminate film as set forth in claim 1, wherein the epoxy-group-containing unsaturated compound is glycidyl (meth)acrylate(2,3-epoxypropyl(meth)acrylate or 3,4-epoxycyclohexyl(meth)acrylate.

11. The laminate film as set forth in claim 1, wherein the unsaturated compound whose molecule has a polymerizable unsaturated bond is selected from the group consisting of alkyl(meth)acrylate, alicyclic(meth)acrylate, aromatic(meth)acrylate, alkoxyalkyl(meth)acrylate, hydroxyalkyl(meth)acrylate, alkoxyalkoxyalkyl(meth)acrylate, alkoxy(poly)alkyleneglycol(meth)acrylate, octafluoropentyl(meth)acrylate, and dialkylaminoalkyl(meth)acrylate.

12. The laminate film as set forth in claim 1, wherein the epoxy-group-containing copolymer has a weight average molecular weight of not less than 30,000 and not more than 200,000.

13. The laminate film as set forth in claim 1, wherein the acrylic-based polymer (B1) is obtained by reacting (a) an epoxy group contained in the epoxy-group-containing copolymer with (b) the long-chain unsaturated carboxylic acid and (c) a carboxyl group contained in the short-chain unsaturated carboxylic acid.

14. The laminate film as set forth in claim 1, wherein the acrylic-based polymer (B1) is obtained by reacting (a) a hydroxyl group of an adduct with (b) isocyanato-group-containing (meth)acrylic compound, the adduct being obtained by reacting (i) an epoxy-group-containing copolymer containing an acrylic resin structure with (ii) a long-chain unsaturated carboxylic acid having a molecular weight of 150 or more and (iii) a short-chain unsaturated carboxylic acid having a molecular weight of less than 150.

15. The laminate film as set forth in claim 14, wherein the isocyanato-group-containing (meth)acrylic compound is an adduct obtained by reacting (a) 1 mol of a (meth)acrylate compound whose molecule has one hydroxyl group with (b) 1 mol of a diisocyanate compound.

16. A laminate film as set forth in claim 1, wherein the long-chain unsaturated carboxylic acid is a caprolactone modified (meth)acrylic acid or a compound obtained by ring-opening reaction between hydroxyl-group-containing meth (acrylate) and carboxylic anhydride.

* * * * *